(12) United States Patent
Aso

(10) Patent No.: US 12,541,540 B2
(45) Date of Patent: Feb. 3, 2026

(54) INFORMATION PROCESSING DEVICE, TERMINAL DEVICE, INFORMATION PROCESSING SYSTEM, INFORMATION PROCESSING METHOD, AND RECORDING MEDIUM

(71) Applicant: CASIO COMPUTER CO., LTD., Tokyo (JP)

(72) Inventor: Asami Aso, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 504 days.

(21) Appl. No.: 18/072,927

(22) Filed: Dec. 1, 2022

(65) Prior Publication Data

US 2023/0177074 A1    Jun. 8, 2023

(30) Foreign Application Priority Data

Dec. 7, 2021   (JP) .................................. 2021-198171
Apr. 18, 2022  (JP) .................................. 2022-067979

(51) Int. Cl.
*G06F 16/3329* (2025.01)
*G06F 16/3332* (2025.01)

(52) U.S. Cl.
CPC ...... *G06F 16/3329* (2019.01); *G06F 16/3334* (2019.01)

(58) Field of Classification Search
CPC ............. G06F 16/3329; G06F 16/3334; G06F 16/334; G06F 16/338; G09B 7/02; G09B 7/04
See application file for complete search history.

(56) References Cited

U.S. PATENT DOCUMENTS

| | | | | |
|---|---|---|---|---|
| 2013/0196292 A1* | 8/2013 | Brennen | ................ | G09B 19/06 434/156 |
| 2021/0271498 A1* | 9/2021 | Morota | .................. | G06F 9/453 |
| 2021/0295727 A1* | 9/2021 | Watanabe | ................ | G09B 7/04 |

FOREIGN PATENT DOCUMENTS

| | | | | |
|---|---|---|---|---|
| JP | 07230245 A | * | 8/1995 | |
| JP | 2000098864 A | | 4/2000 | |
| JP | 2015060492 A | * | 3/2015 | |
| WO | WO-2012064997 A2 | * | 5/2012 | ............. A47C 20/04 |

OTHER PUBLICATIONS

Electronic Dictionary, Learning Word Judging Method, And Recording Medium, CN 112541071 A, Ogawa, Kentaro (Year: 2021).*
Educational Support System and Terminal Device, WO 2016174951 A1, Nishizawa, Tatsuo (Year: 2016).*
18072927_7_WO_2012064997_A2_I (Year: 2012).*
JP_patent_publication_1995_07-230245_A_Yamagata_Hiroko (Year: 1995).*

* cited by examiner

*Primary Examiner* — Paras D Shah
*Assistant Examiner* — Ali M Hassan
(74) *Attorney, Agent, or Firm* — Holtz, Holtz & Volek PC

(57) ABSTRACT

A central processing unit (CPU) of an information processing device acquires search history information on a word related to a question asked to a user and determines hint information related to the question to be presented to the user based on a discrimination result obtained by determining whether or not the acquired search history information satisfies a predetermined search history condition.

10 Claims, 22 Drawing Sheets

FIG. 3

Figure 1:
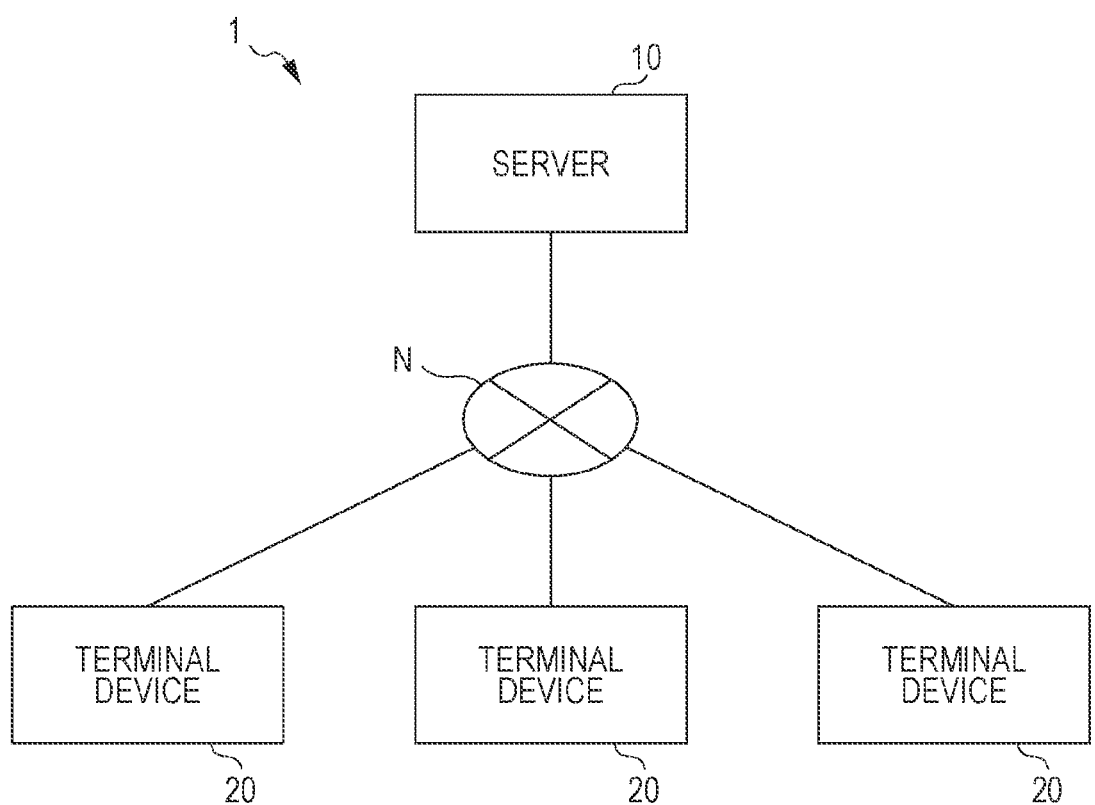

| WORD ID | WORD | TRANSLATION | EXAMPLE SENTENCE | PART OF SPEECH | PROFICIENCY DIFFICULTY LEVEL | AUDIO FILE PATH |
|---|---|---|---|---|---|---|
| W1 | apple | りんご | an apple is ⋯ | COMMON NOUN | 1 | /file/path/w1.mp3 |
| W2 | software | ソフトウェア | a software is ⋯ | COMMON NOUN | 4 | /file/path/w2.mp3 |
| W3 | orange | みかん | an orange is ⋯ | COMMON NOUN | 2 | /file/path/w3.mp3 |
| ⋮ | ⋮ | ⋮ | ⋮ | ⋮ | ⋮ | ⋮ |

132

FIG. 4

133

| QUESTION NUMBER | TEXT | TRANSLATION | AUDIO FILE PATH | IMAGE FILE PATH | CORRECT ANSWER |
|---|---|---|---|---|---|
| 1 | A. The woman is sitting at her desk. B. The woman is … | A. 女性が自分の机に座っています。B. 女性が… | /file/path/q1.mp3 | /file/path/q1.jpg | B |
| 2 | A. New patients should arrive fifteen minutes before … | A. 新しい患者は15分前に到着する必要が… | /file/path/q2.mp3 | /file/path/q2.jpg | A |
| 3 | A. The final version of the buget proposal … | A. 予算案の最終版は… | /file/path/q3.mp3 | /file/path/q3.jpg | D |
| ⋮ | ⋮ | ⋮ | ⋮ | ⋮ | ⋮ |

FIG. 6

135

| USER ID | WORD | SEARCH DATE | HINT DISPLAY DATE | AUDIO PLAY |
|---|---|---|---|---|
| U1234 | software | 2021/8/15 | 2021/9/1 | 0 |
| | car | | 2021/9/1 | 0 |
| | bus | 2021/8/20 | 2021/9/1 | 0 |
| | bicycle | 2021/8/15 | | 0 |

| USER ID | WORD | SEARCH DATE | HINT DISPLAY DATE | AUDIO PLAY |
|---|---|---|---|---|
| U1235 | dog | 2021/8/1 | | 0 |
| | cat | 2021/8/1 | | 0 |
| | lion | | | 1 |
| | software | | 2021/7/15 | 0 |

· · · ·

AUDIOS OF QUESTION SENTENCES:

A: The woman is sitting at her desk.

B: The woman is downloading the software on her computer.

C: The woman is watching the movie on her computer.

D: The woman is writing a message to her friend.

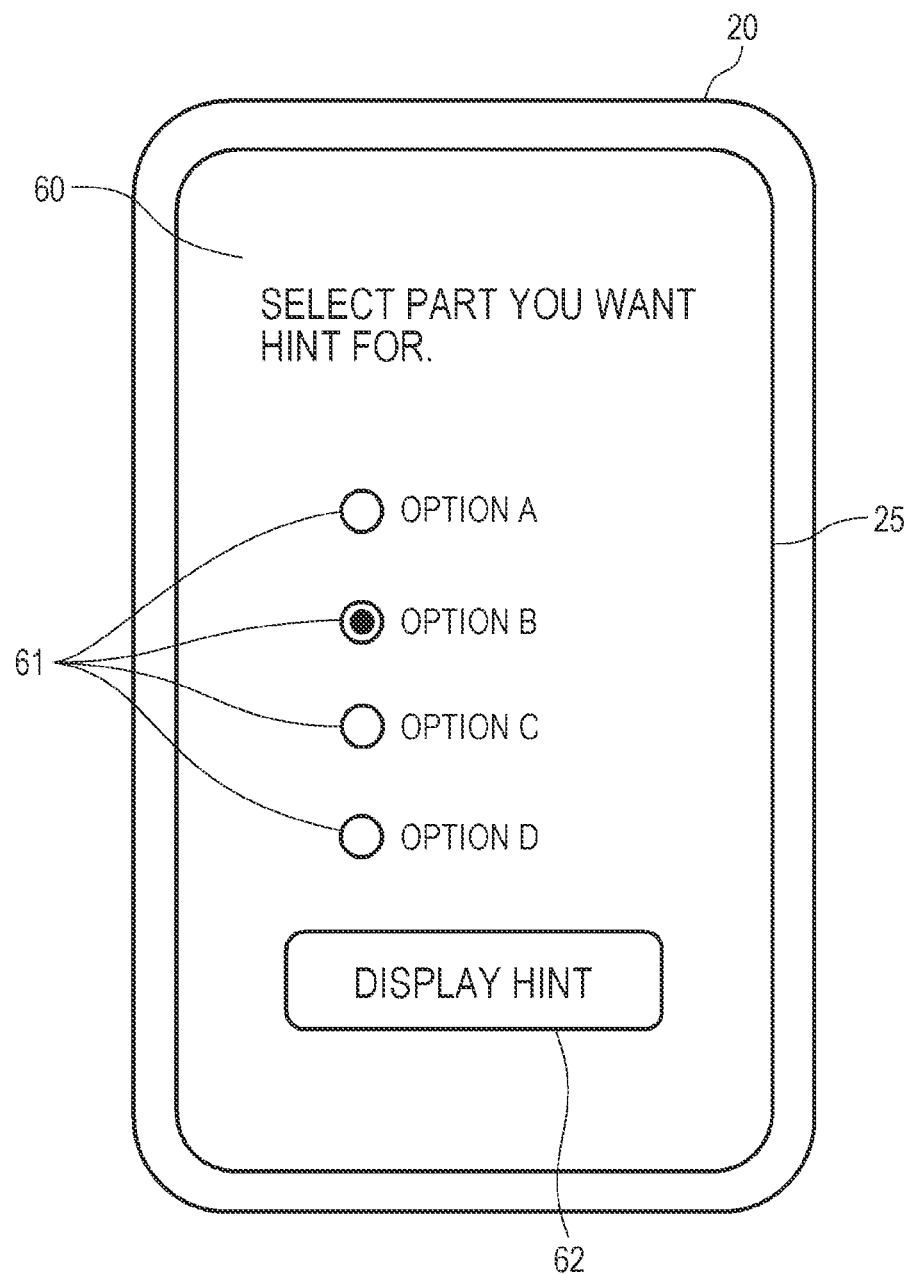

INFORMATION PROCESSING DEVICE, TERMINAL DEVICE, INFORMATION PROCESSING SYSTEM, INFORMATION PROCESSING METHOD, AND RECORDING MEDIUM

BACKGROUND

1. Technical Field

The present disclosure relates to an information processing device, a terminal device, an information processing system, an information processing method, and a recording medium.

2. Related Art

Conventionally, among terminal devices usable for the learning of various subjects such as languages, there has been a terminal device that can perform a test (ask questions and determine whether answers are correct or incorrect) in order to determine a learning level and fix learning content. Japanese Patent Application Laid-Open No. 2000-98864 discloses a method for presenting hint information registered in advance in association with a test question to a user in response to a presentation request made by the user to present the hint information when the question has been asked to the user on such a terminal device. The presentation of the hint information as above can be applied in language learning, for example, in the form of presenting the meaning of a high-difficulty word included in a question sentence.

SUMMARY

An information processing device according to the present disclosure includes at least one processor. The processor
  acquires search history information on a word related to a question asked to a user, and
  determines hint information related to the question to be presented to the user based on a discrimination result obtained by determining whether or not the acquired search history information satisfies a predetermined search history condition.
Further, the terminal device according to the present disclosure includes at least one processor. The processor
  asks a question to a user,
  presents hint information related to the question to the user in response to a presentation request made by the user to present the hint information, and
  determines the hint information based on a discrimination result of whether or not search history information of a word related to the question satisfies a predetermined search history condition.
An information processing system according to the present disclosure includes
  an information processing device and a terminal device connected to each other so as to be able to communicate information.
The information processing device and the terminal device each include at least one processor.
The processor of the information processing device
  acquires, from the terminal device, history information of a search performed by a user for a word related to a question transmitted to the terminal device and asked by the processor of the terminal device, and
  determines hint information related to the question to be presented to the user based on a discrimination result obtained by determining whether or not the acquired search history information satisfies a predetermined search history condition.
The processor of the terminal device presents the hint information to the user.

BRIEF DESCRIPTION OF THE DRA WINGS

Figure 2:
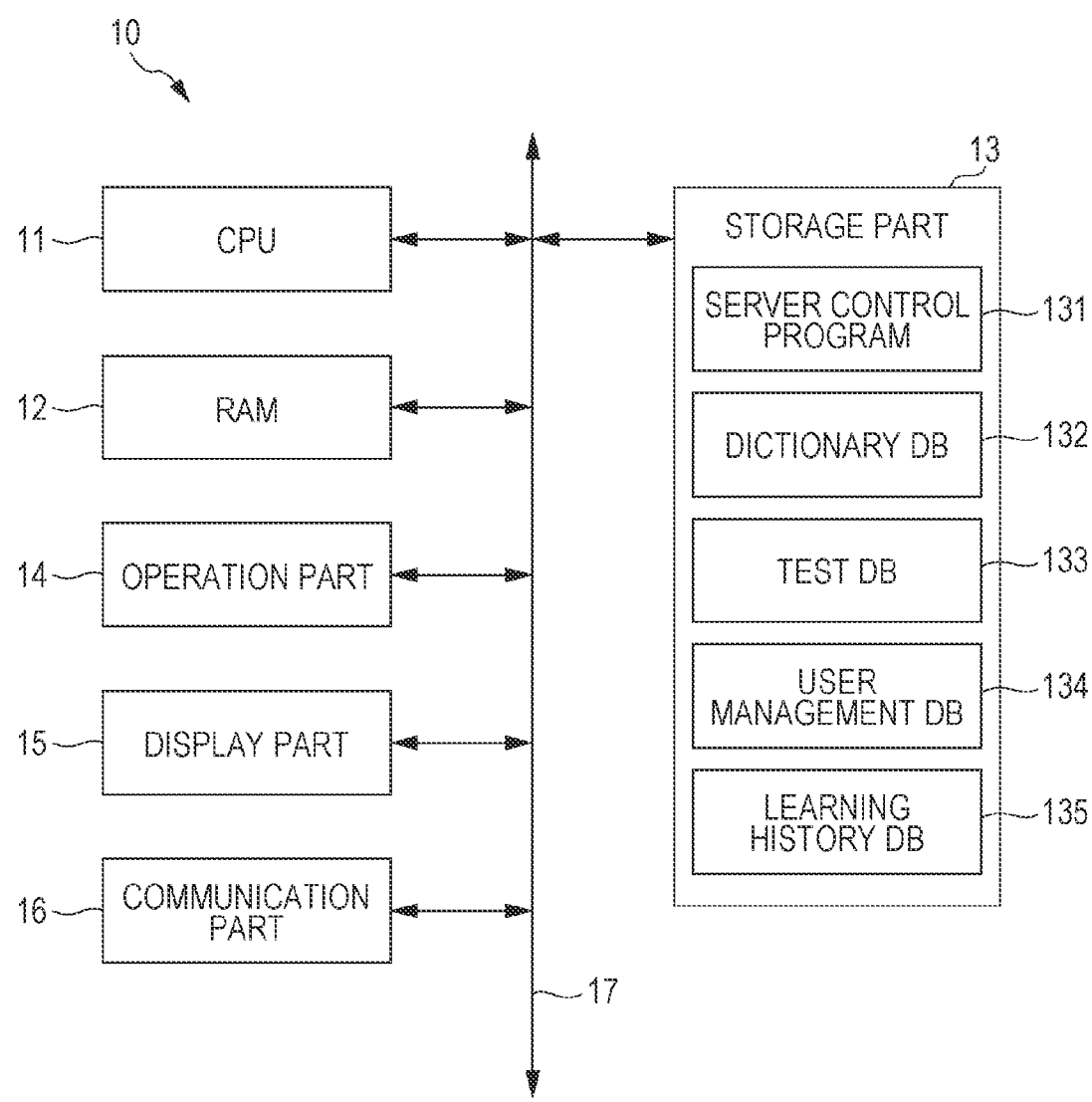
Figure 5:
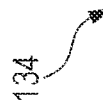
Figure 7:
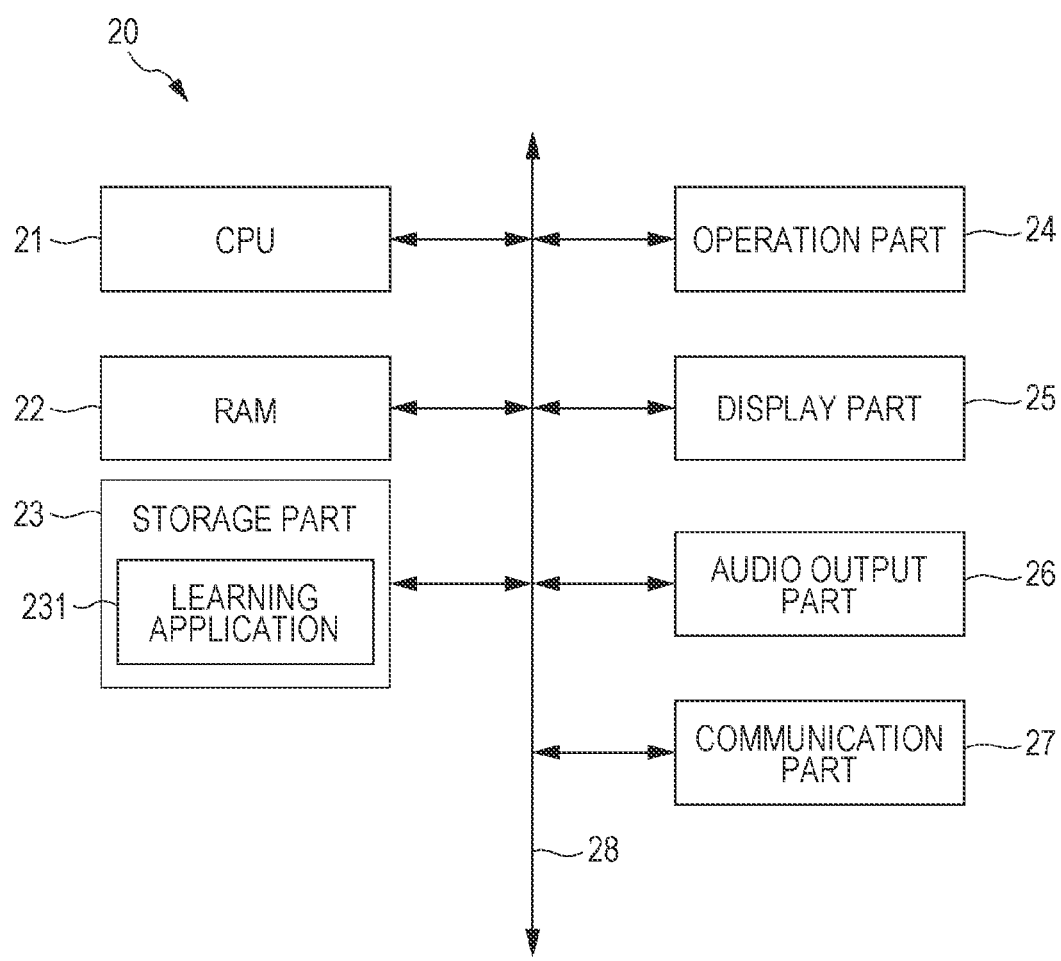
Figure 8:
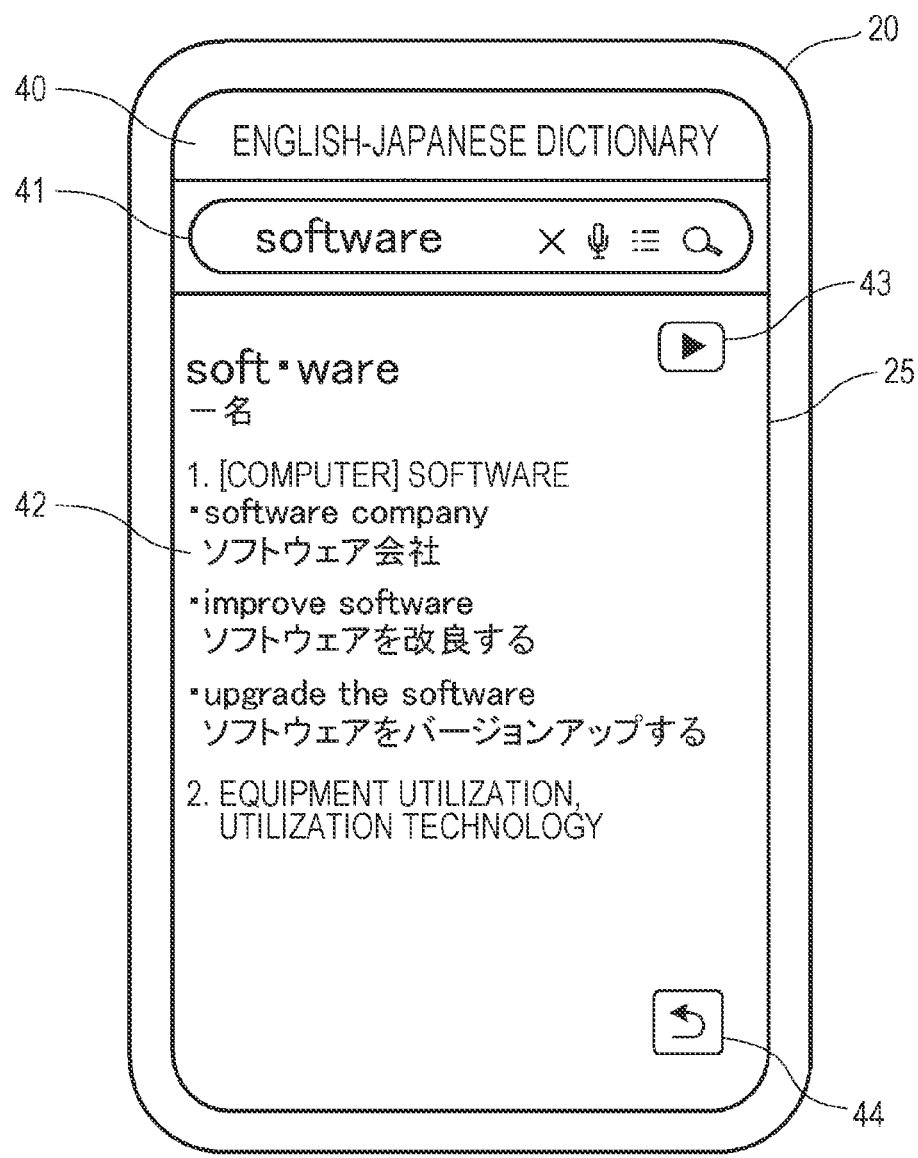
Figure 9:
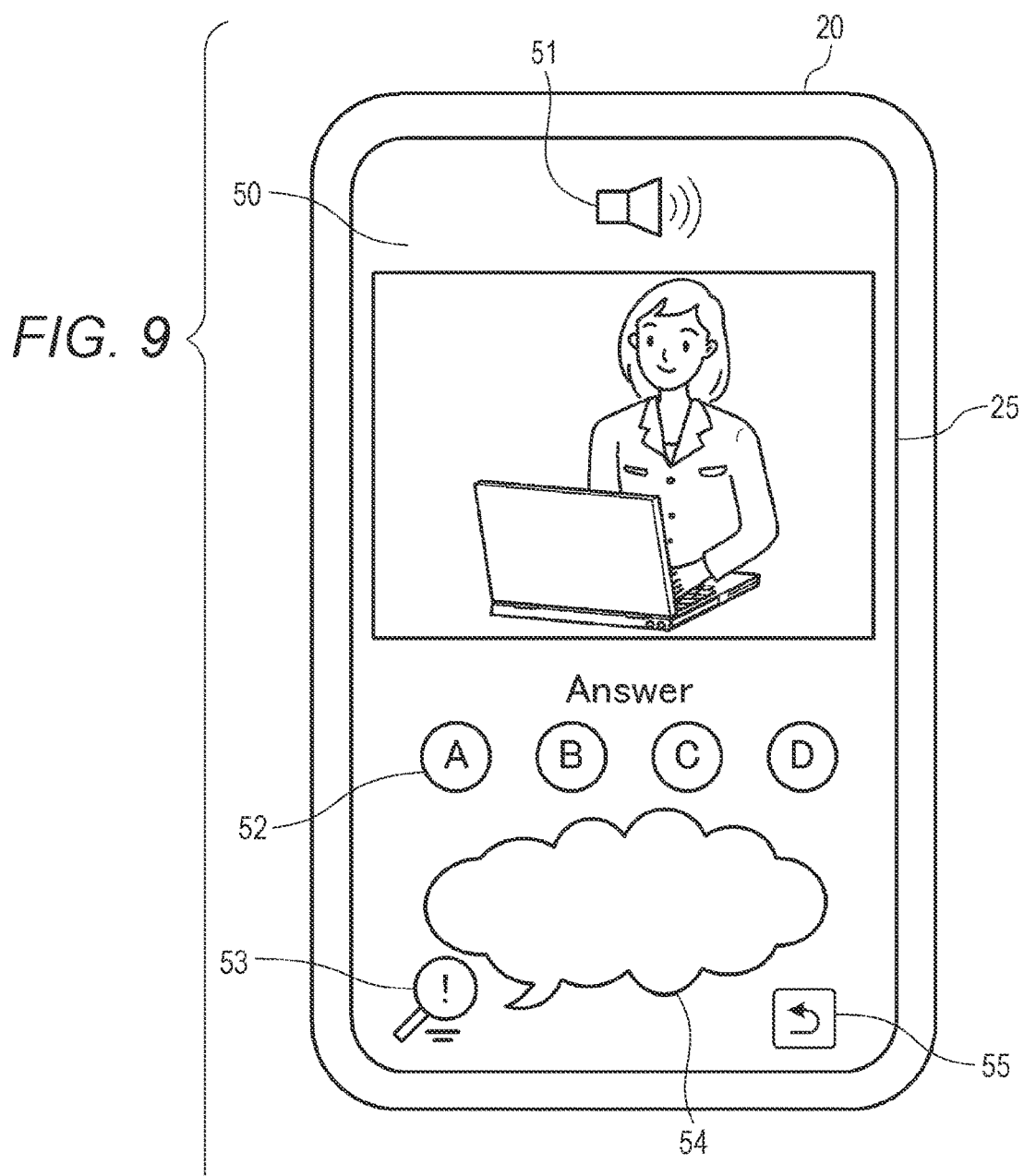
Figure 11A:
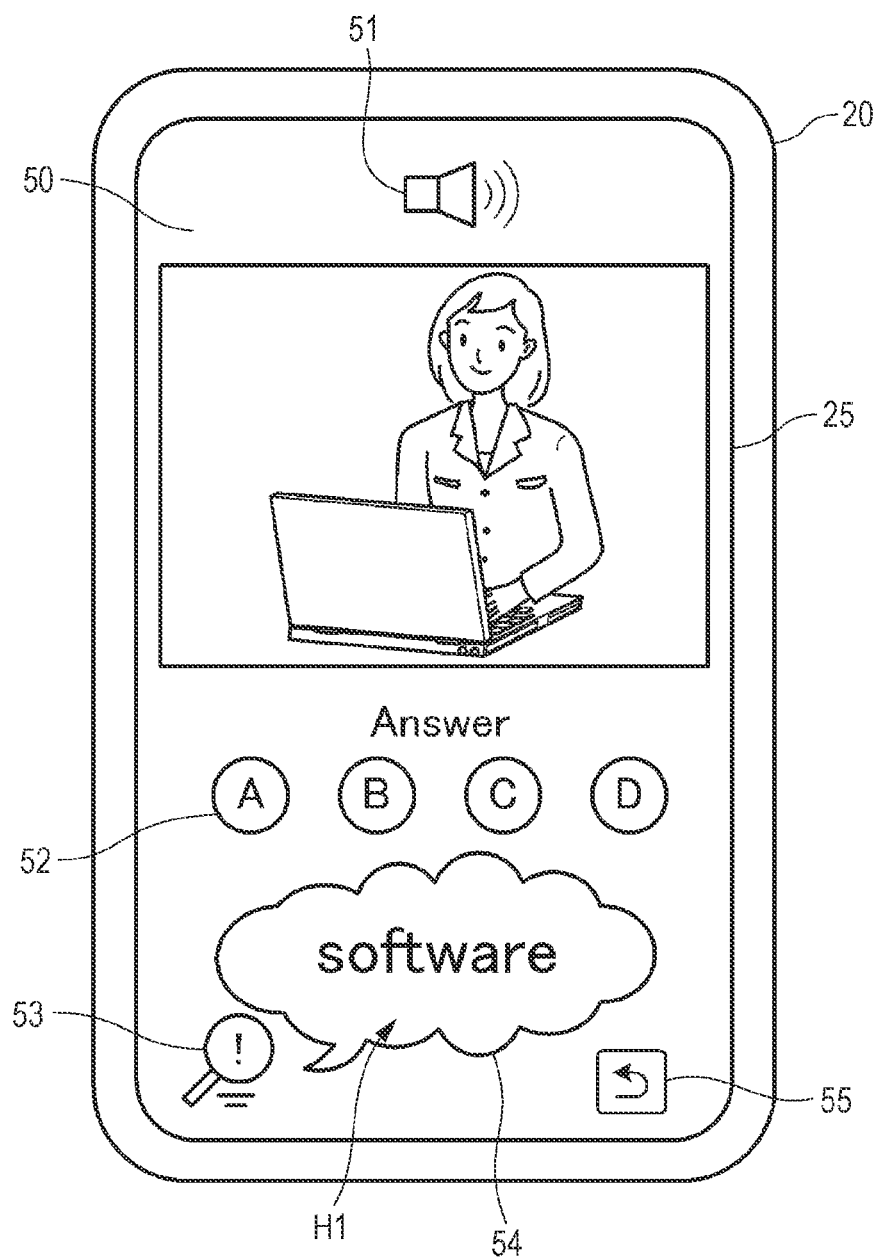
Figure 11B:
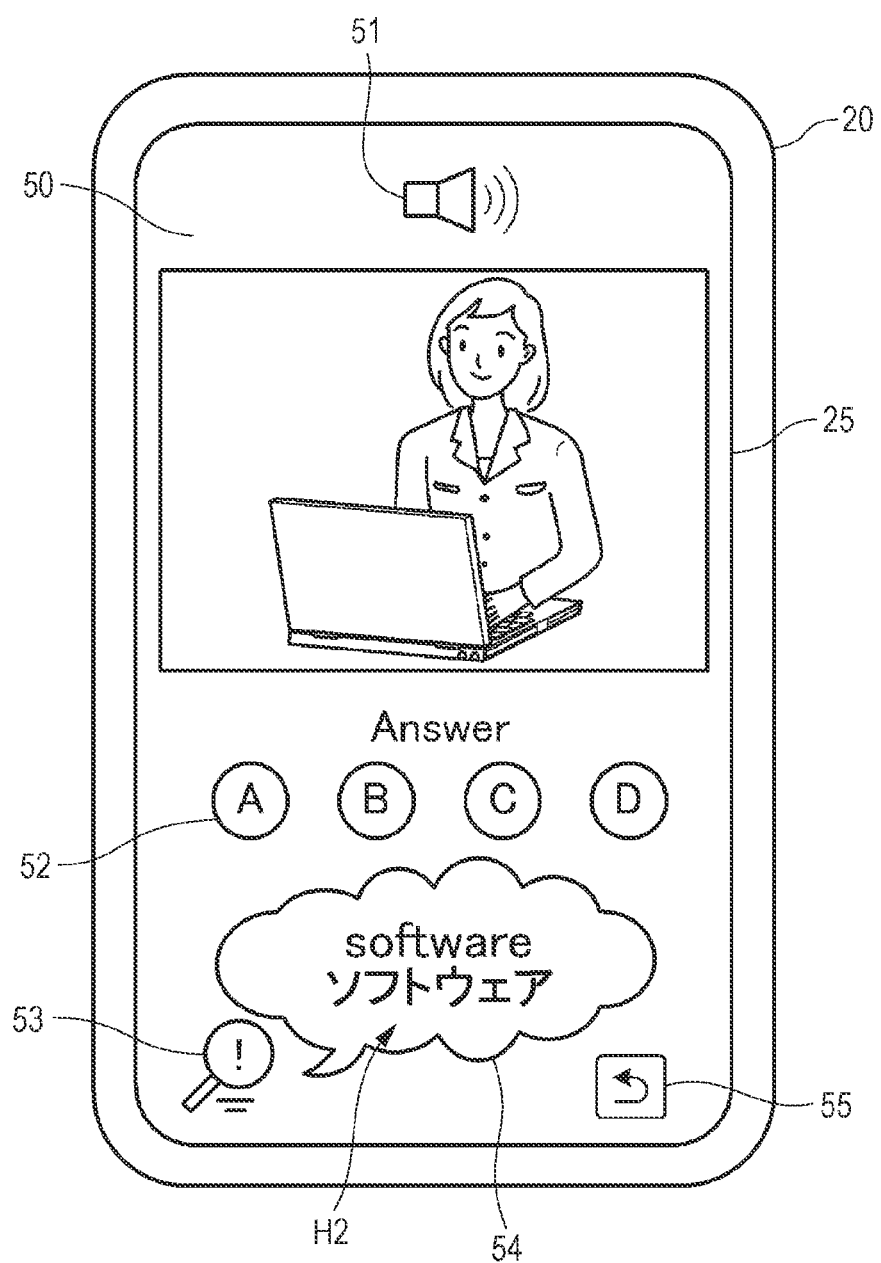
Figure 12A:
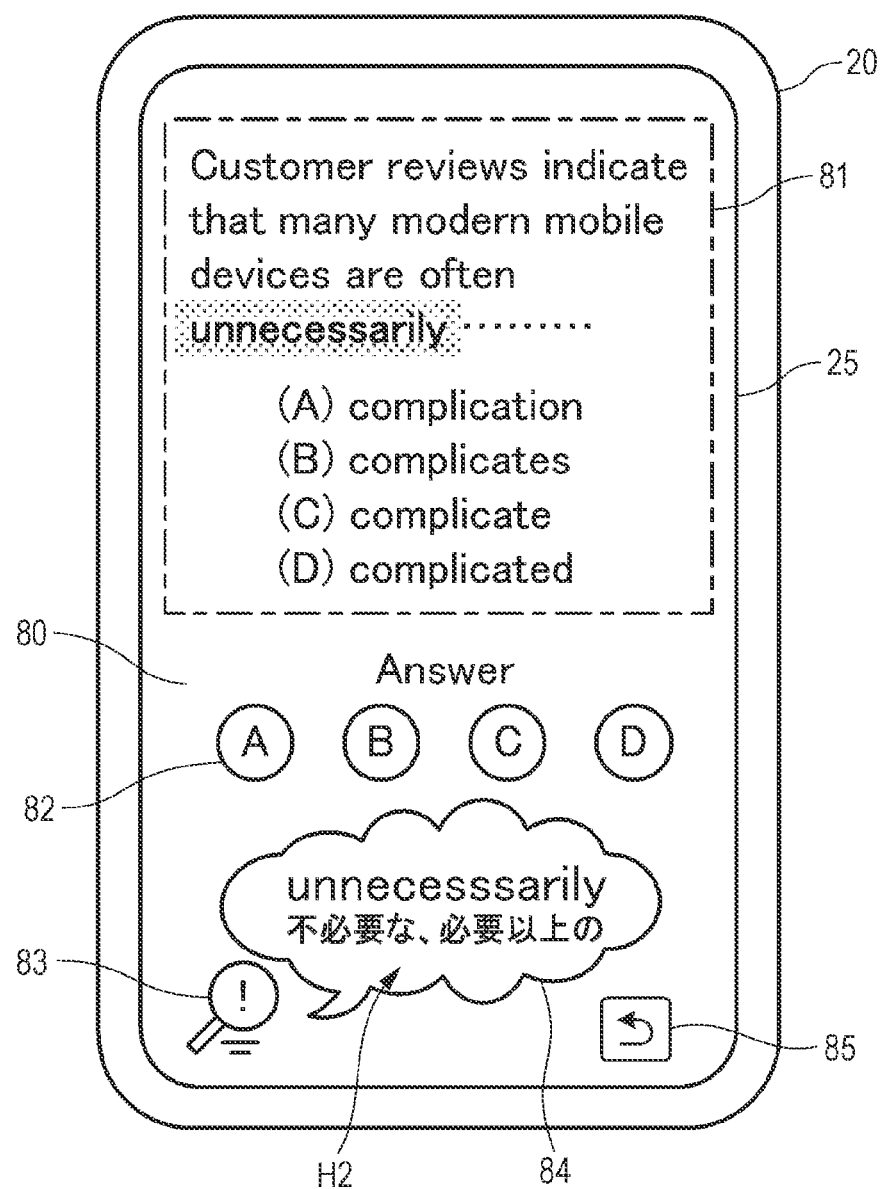
Figure 12B:
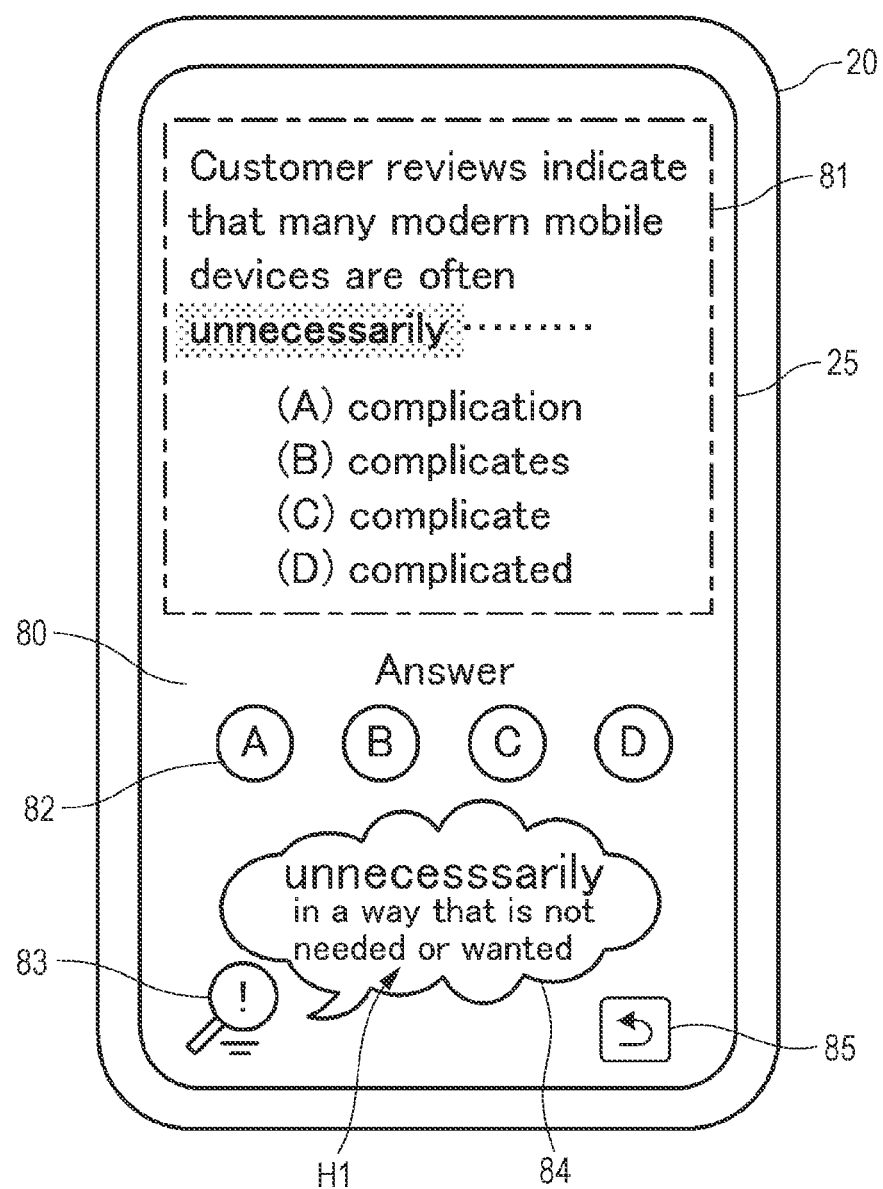
Figure 13:
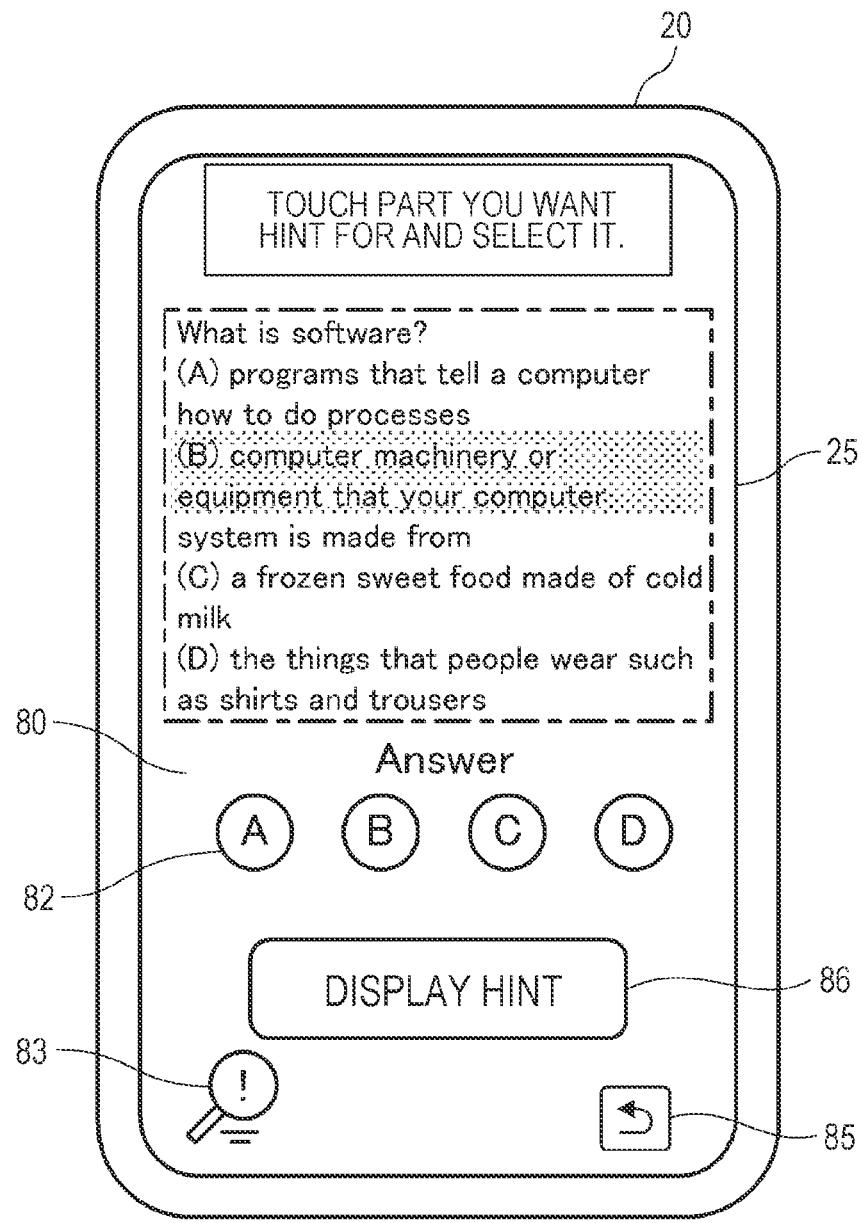
Figure 14:
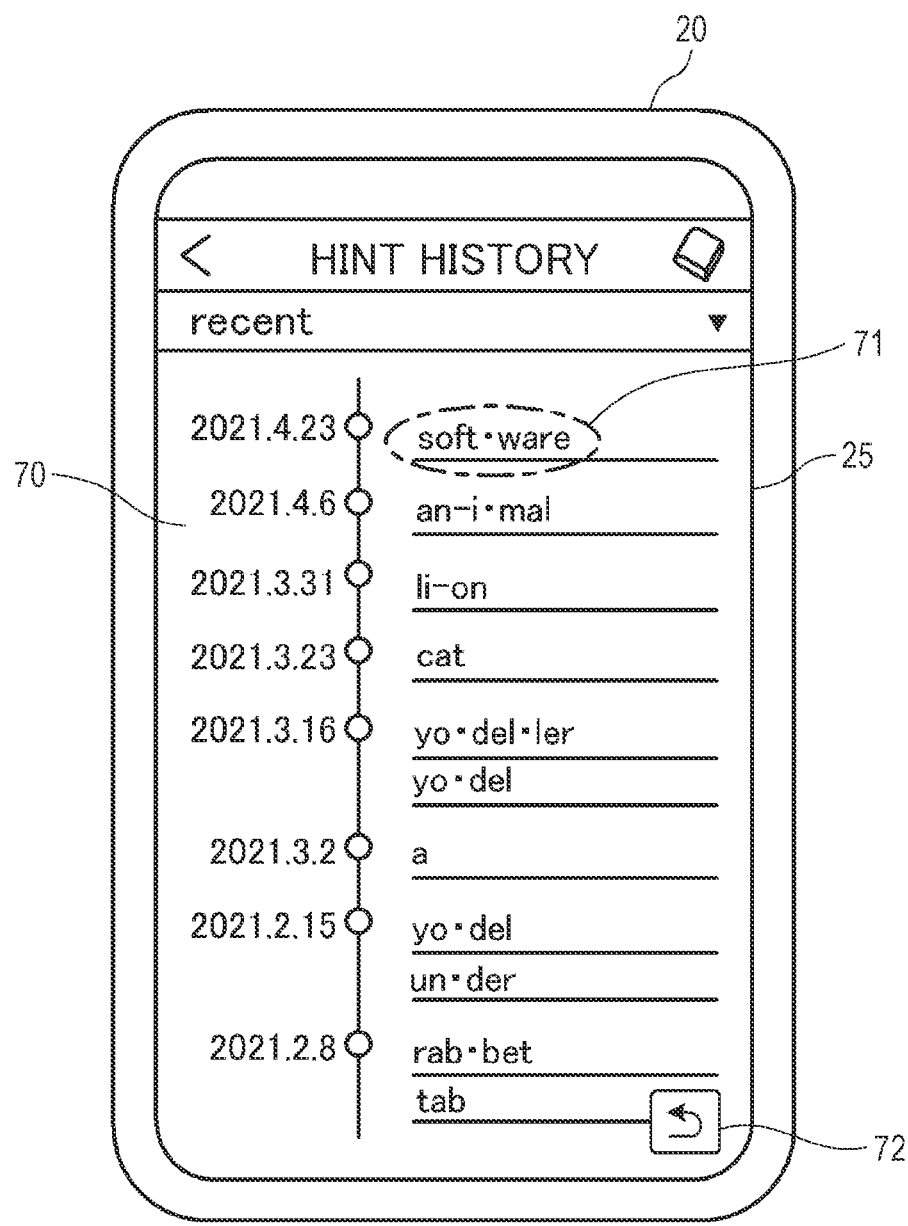
Figure 15:
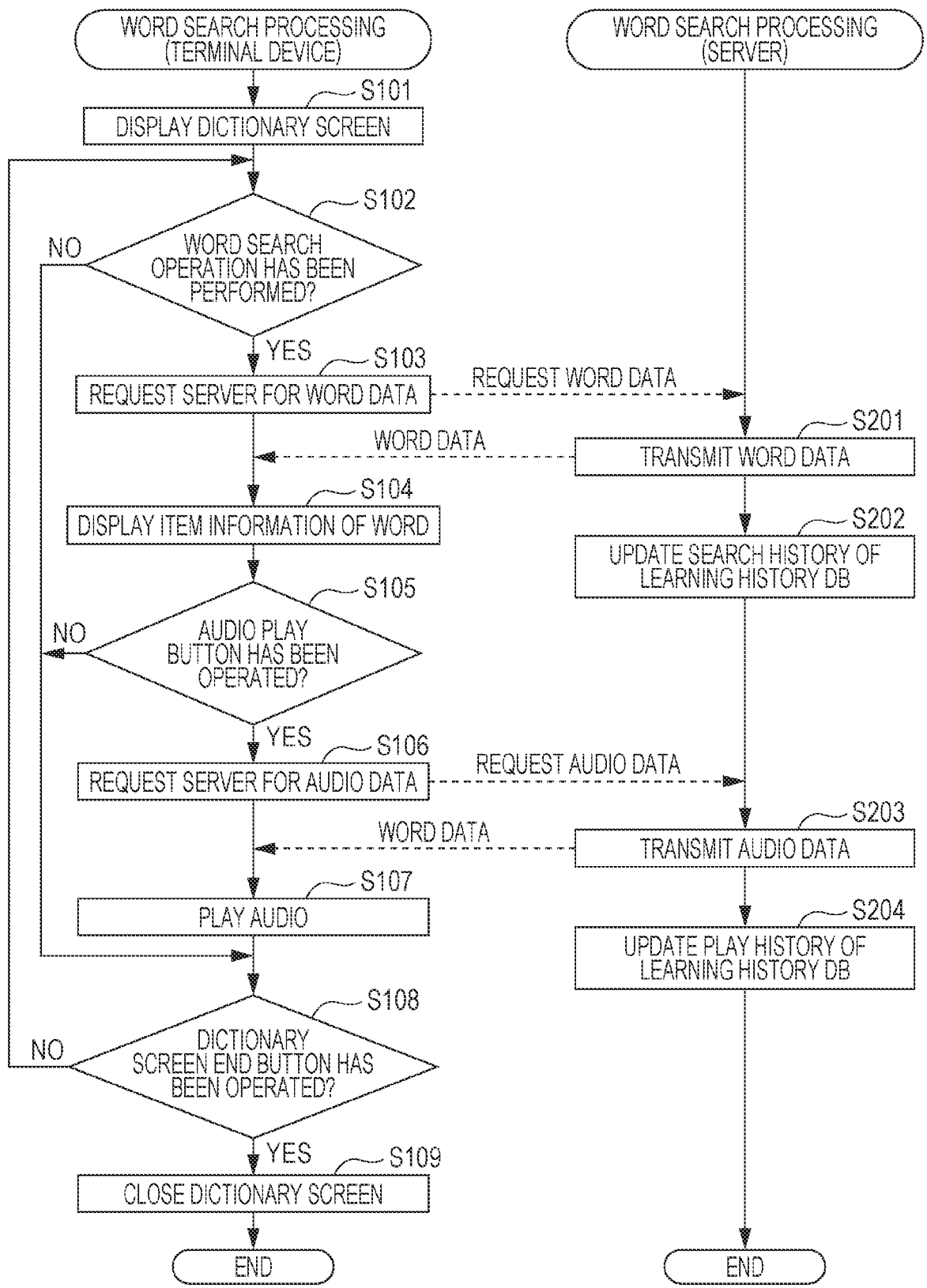
Figure 16:
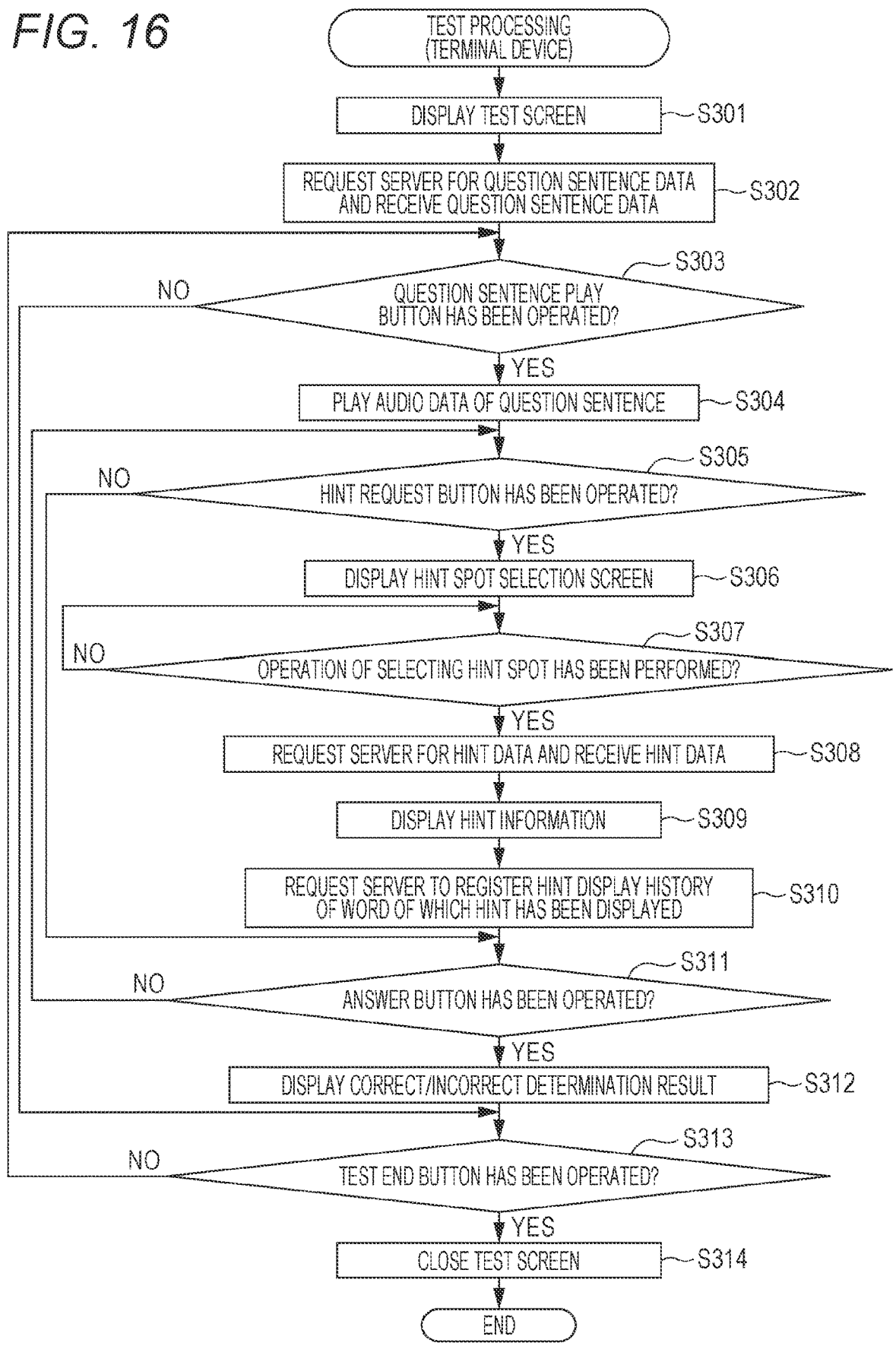
Figure 17:
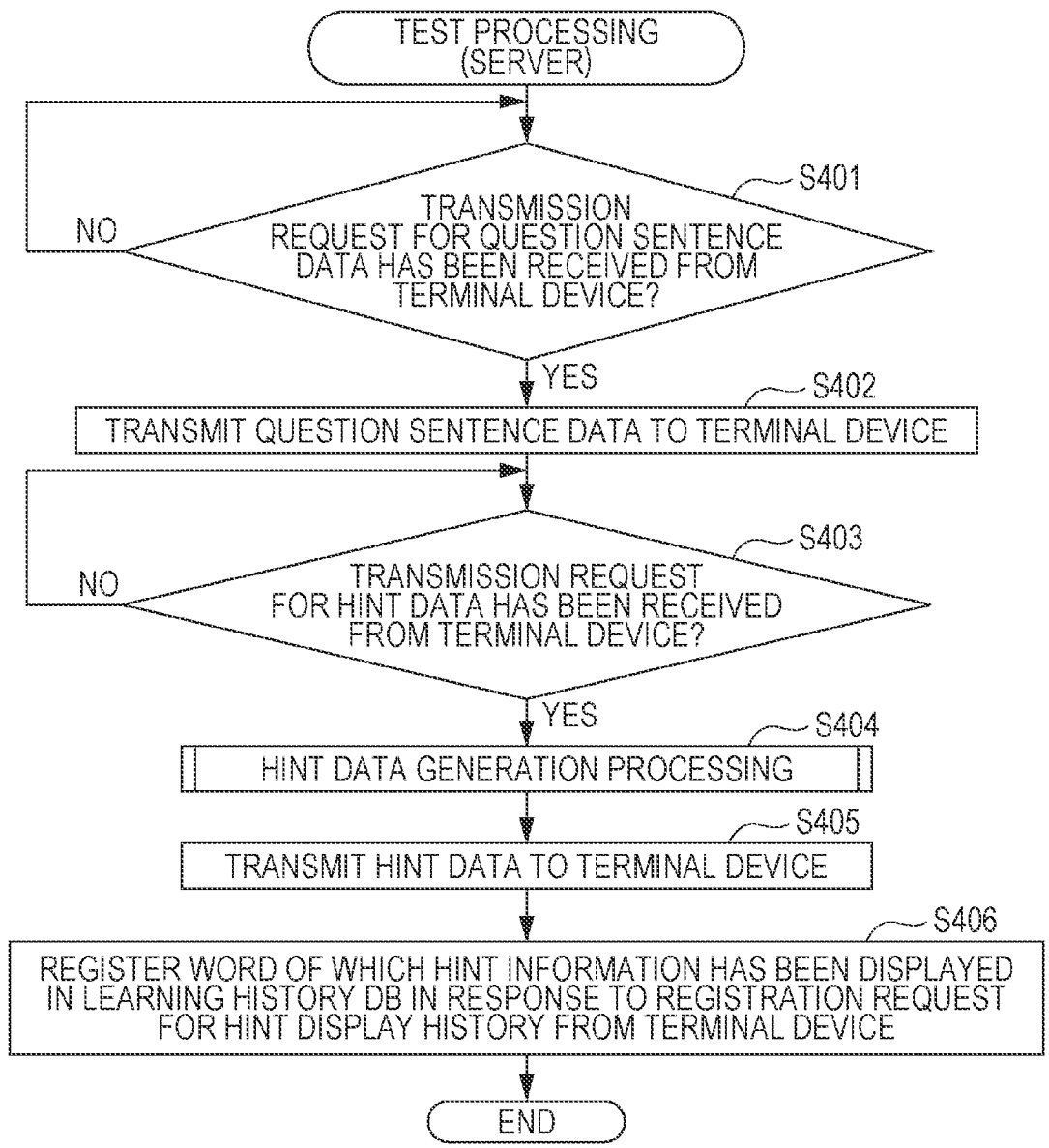
Figure 18:
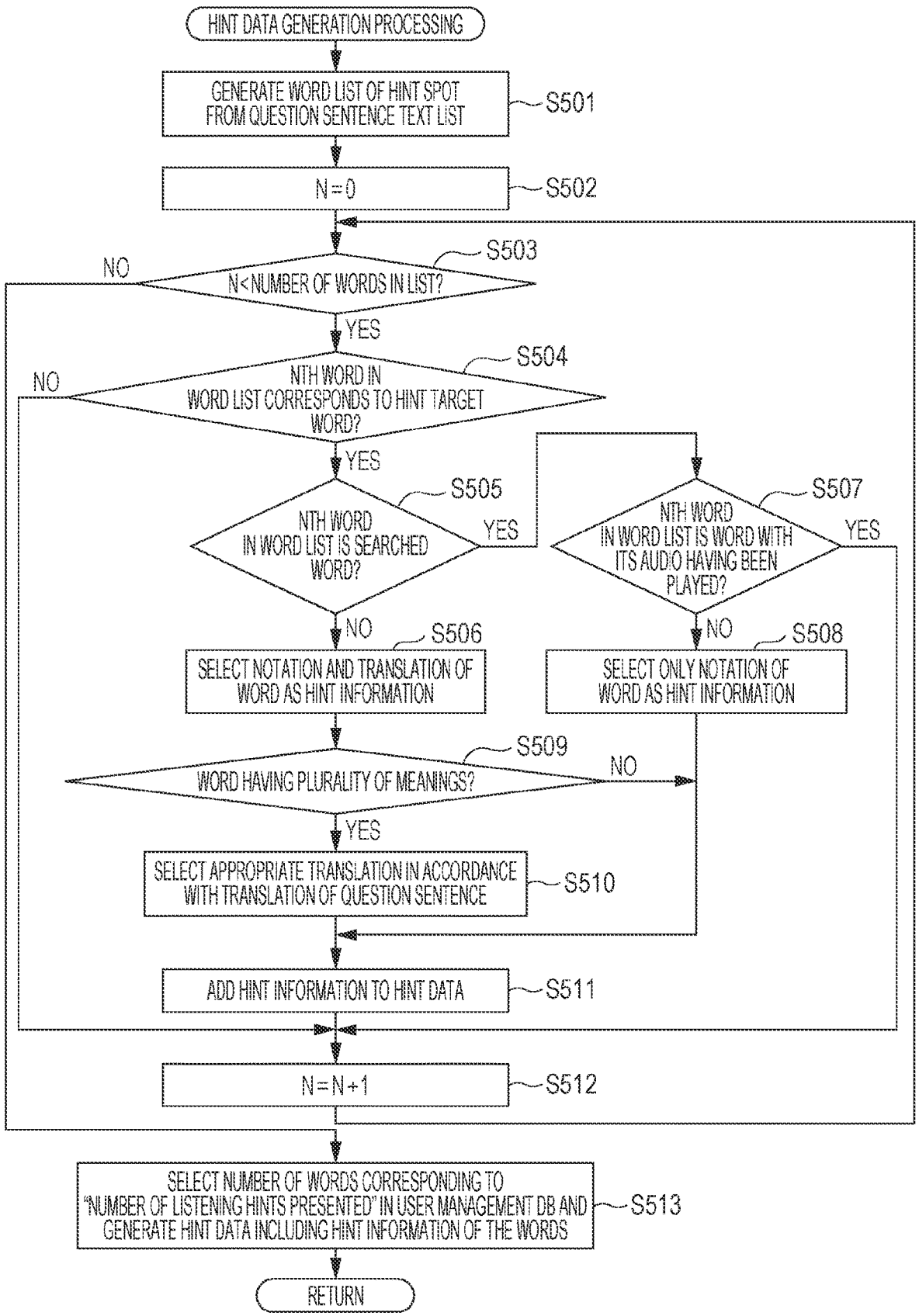
Figure 19:
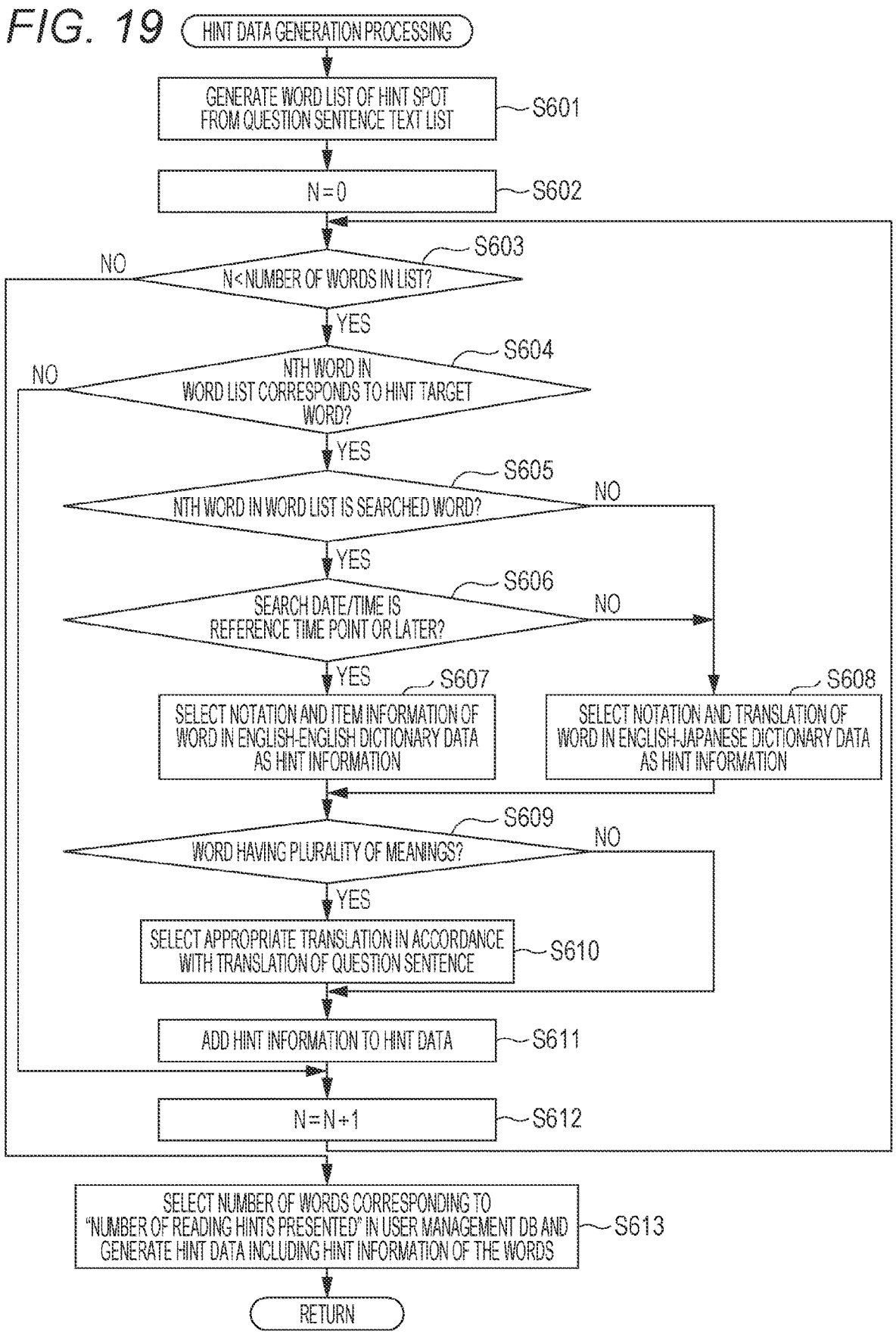
Figure 20:
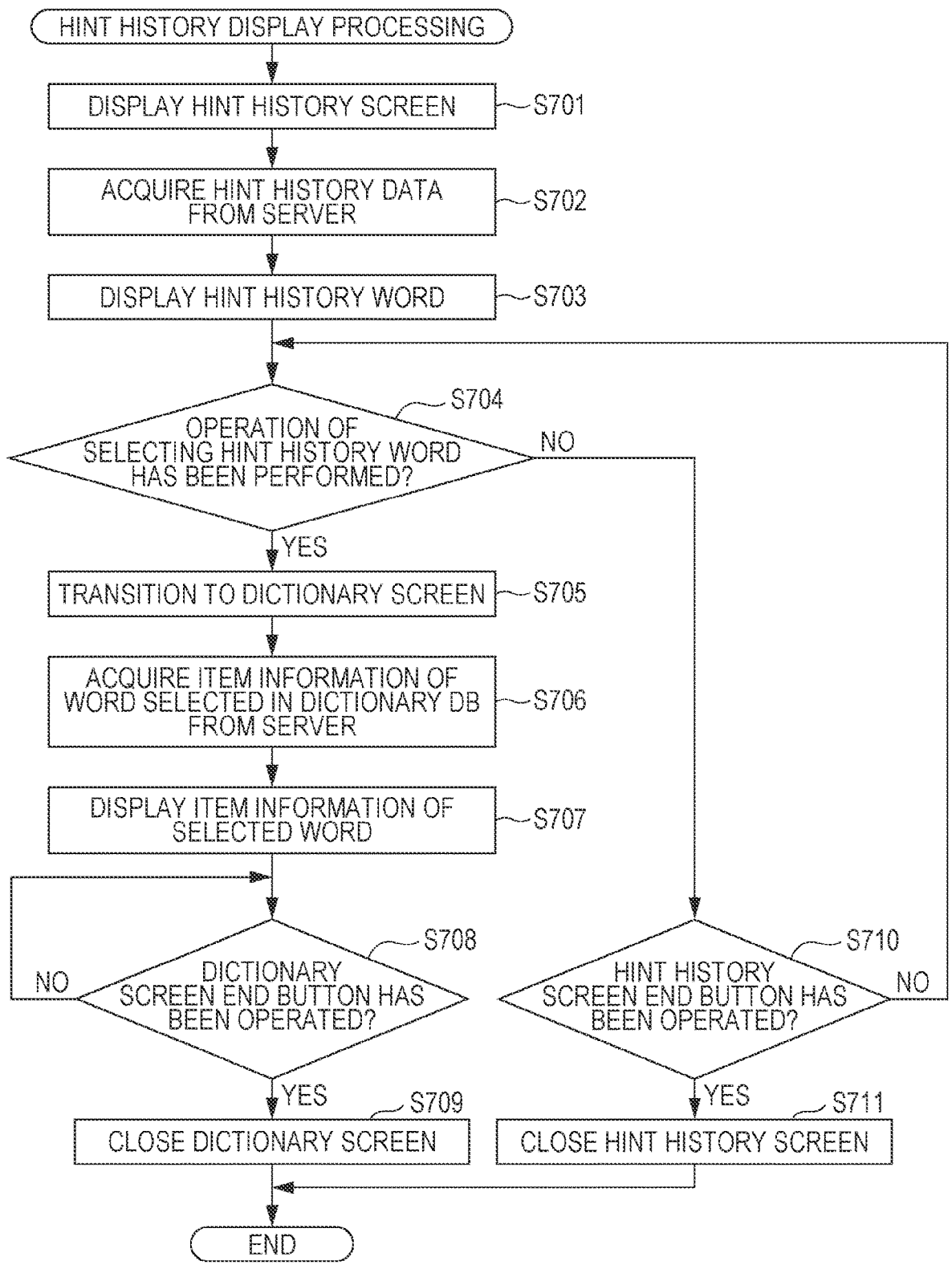

FIG. 1 is a schematic configuration diagram of a learning support system;
FIG. 2 is a block diagram illustrating a functional configuration of a server;
FIG. 3 is a diagram illustrating a content example of a dictionary database (DB);
FIG. 4 is a diagram illustrating a content example of a test DB;
FIG. 5 is a diagram illustrating a content example of a user management DB;
FIG. 6 is a diagram illustrating a content example of a learning history DB;
FIG. 7 is a block diagram illustrating a functional configuration of a terminal device;
FIG. 8 is a view illustrating a dictionary screen;
FIG. 9 is a view illustrating a test screen for performing a listening test;
FIG. 10 is a view illustrating a hint spot selection screen;
FIG. 11A is a view illustrating a test screen on which hint information is being displayed;
FIG. 11B is a view illustrating a test screen on which hint information is being displayed;
FIG. 12A is a view illustrating a test screen for performing a reading test;
FIG. 12B is a view illustrating a test screen for performing the reading test;
FIG. 13 is a view illustrating another example of the test screen for performing the reading test;
FIG. 14 is a view illustrating a hint history screen;
FIG. 15 is a flowchart illustrating a control procedure for the word search processing;
FIG. 16 is a flowchart illustrating a control procedure for test processing executed by a central processing unit (CPU) of the terminal device;
FIG. 17 is a flowchart illustrating a control procedure for test processing executed by the CPU of the server;
FIG. 18 is a flowchart illustrating a control procedure for hint data generation processing;
FIG. 19 is a flowchart illustrating a control procedure for hint data generation processing in the reading test; and
FIG. 20 is a flowchart illustrating a control procedure for hint history display processing.

DETAILED DESCRIPTION

Hereinafter, an embodiment of the present disclosure will be described with reference to the drawings.
<Configuration of Learning Support System>
FIG. 1 is a schematic configuration diagram of a learning support system 1 of the present embodiment.
The learning support system 1 (information processing system) includes a server 10 (information processing device) and a terminal device 20 connected to the server 10 so as to be able to communicate information through a communication network N. The communication network N is, for example, the Internet, but is not limited thereto, and may be another network such as a local area network (LAN). At least a part of a communication path between the server 10 and the terminal device 20 may be a wireless communication path.

The learning support system 1 provides a learning support service that supports the learning of a language to a user who uses the terminal device 20. The terminal device 20 is, for example, a smartphone, but is not limited thereto, and may be a tablet terminal, a notebook personal computer (PC), a stationary PC, or the like.

In the terminal device 20, an application program for learning (hereinafter referred to as a "learning application 231 (cf. FIG. 7)") is installed. By executing the learning application 231, the terminal device 20 can provide various services related to language learning to the user in cooperation with the server 10. For example, when a search instruction for a word is input from the user while the learning application 231 is being executed, the terminal device 20 acquires and displays item information including the meaning of the word, example sentences, and the like from the server 10. Here, the word to be searched for is, for example, a dictionary headword and a dictionary entry. However, the word to be searched for is not limited thereto but includes any word, which is included in data accessible by the terminal device 20, and a search history of which can be stored in a database. For example, the word to be searched for may be a word included in data related to a book or document, such as a textbook, a material collection, or a reference book, or a word included in data that is provided by various Web services such as news and electronic commerce and that can be acquired through the communication network N. The data related to the book or document described above may be stored in a storage part 13 (cf. FIG. 2) of the server 10 or a storage part 23 (cf. FIG. 7) of the terminal device 20, or may be stored in another Web server or the like that can be connected for communication through the communication network N. In addition, the word to be searched for is not limited to a single word but may be a combination of a plurality of words. The search of the word performed in the terminal device 20 is not limited to a search performed for the purpose of examining the meaning and pronunciation of the word itself but includes a search performed for the purpose of acquiring information related to the word (e.g., a mathematical formula, a chemical formula of a chemical substance, a structural formula, a symbol, a news article and a commentary article related to the word, etc.).

The terminal device 20 can perform a test type exercise related to language (hereinafter referred to simply as a "test") while the learning application 231 is being executed. In a case that the test is performed, the terminal device 20 acquires data of a question and a correct answer from the server 10 and asks the question to the user. When an answer to the question is input from the user, the terminal device 20 performs correct/incorrect determination on the answer and presents a result to the user. When a question has been asked, the terminal device 20 can present hint information related to the question to the user in response to a request from the user.

The above is an example of the services provided by the learning support system 1, and the present invention is not limited thereto.

As illustrated in FIG. 1, the learning support system 1 may include a plurality of terminal devices 20, and in this case, the learning support service is provided to a plurality of users who respectively use the plurality of terminal devices 20. The server 10 manages information related to the usage status of the learning support service of each user and provides the user with an appropriate service in accordance with the information. For example, when the hint information is presented in the test, the hint information having appropriate content in accordance with the history of the search for the word by each user is presented. A method for presenting the hint information will be described in detail later.

<Configuration of Server>

FIG. 2 is a block diagram illustrating a functional configuration of the server 10.

The server 10 includes a central processing part (CPU) (reception unit, acquisition unit, discrimination unit, determination unit, and hint history presentation unit) 11, a random-access memory (RAM) 12, a storage part 13, an operation part 14, a display part 15, a communication part 16, a bus 17, and the like. Each part of the server 10 is connected through the bus 17.

The CPU 11 is a processor (processing part) that reads and executes a server control program 131 (program) stored in the storage part 13 and performs various types of arithmetic processing to control the operation of the server 10. Note that the server 10 may include a plurality of processors (e.g., a plurality of CPUs), and the plurality of processors may execute a plurality of types of processing that are executed by the CPU 11 of the present embodiment. In this case, the plurality of processors form the processing part. In this case, the plurality of processors may be involved in common processing, or each of a plurality of processors may independently execute different processing in parallel.

The storage part 13 is a non-transitory recording medium readable by the CPU 11 serving as a computer and stores the server control program 131 and various data. The storage part 13 includes a nonvolatile memory such as a hard disk drive (HDD) or a solid-state drive (SSD). The server control program 131 is stored in the storage part 13 in the form of a computer-readable program code. Examples of the data stored in the storage part 13 include a dictionary database (DB) 132 (dictionary information), a test DB 133, a user management DB 134, and a learning history DB 135 (search history information, hint history information).

FIG. 3 is a diagram illustrating a content example of the dictionary DB 132.

Information included in one data row (record) of the dictionary DB 132 corresponds to item information related to one word (item) of an English-Japanese dictionary or an English-English dictionary. FIG. 3 illustrates item information of the English-Japanese dictionary. The dictionary DB 132 includes data columns (columns) of "Word identification (ID)", "Word", "Translation", "Example sentence", "Part of speech", "Proficiency difficulty level", and "Audio file path".

"Word ID" is a unique code attached to the word of the data row.

"Word" is the notation (spelling) of the word.

"Translation" is a Japanese translation of the word. In the data of the English-English dictionary, an explanatory sentence of the word in English is registered in the data row of "Translation".

"Example sentence" is an example sentence corresponding to the word.

"Part of speech" is the part of speech of the word.

"Proficiency difficulty level" is a numerical value representing the level of the general proficiency difficulty level of the word in the data row. The proficiency difficulty level is a numerical value at a plurality of levels (in the present embodiment, seven stages of "1" to "7"), and the larger the numerical value, the higher the difficulty level. Words having numeral values equal to or more than a predetermined threshold (in the present embodiment, "4" or more) among the plurality of levels of numerical values are candidates for a word for presenting hint information to be described later. Words each having a proficiency difficulty level equal to or greater than the above threshold corresponds to "words each having a proficiency difficulty level equal to or higher than a predetermined lower limit difficulty level".

"Audio file path" is the file path of the audio data file of the word.

Note that the dictionary DB 132 may further store data related to other dictionaries except for the English-Japanese dictionary and the English-English dictionary.

FIG. 4 is a diagram illustrating a content example of the test DB 133.

The test DB 133 stores data related to a test that is provided in the learning support service. One data row (record) of the test DB 133 corresponds to one question. The test DB 133 includes data columns (columns) of "Question number", "Text", "Translation", "Audio file path", "Image file path", and "Correct answer". In FIG. 4, data related to a listening test in English is illustrated.

"Question number" is a number allocated to each question. Instead of the number, a reference sign unique to each question may be used.

"Text" is text data in English text representing a question sentence of a question.

"Translation" is text data of a Japanese translation of the question sentence of the question.

"Audio file path" is a file path of an audio data file of the English question sentence.

"Image file path" is a file path of image data of an image that is displayed while the question is asked.

"Correct answer" is the correct option in the question.

FIG. 5 is a diagram illustrating a content example of the user management DB 134.

The user management DB 134 stores data related to a plurality of users who use the learning support service. One data row (record) of the user management DB 134 corresponds to one user. The user management DB 134 includes data columns (columns) of "User ID", "Occupation", "Number of listening hints presented", and "Number of reading hints presented".

"User ID" is a unique code attached to each user.

"Occupation" is the occupation of the user.

"Number of listening hints presented" represents the number of words displayed as hints in a listening test to be described later. For example, when this data column contains a numerical value (e.g., "1", "2", etc.), the hint information of the same number of words as the numerical value among hint target words is displayed. When the data column contains "all", the hint information of all the hint target words is displayed. Here, the "hint target word" is a word that can be a display target of hint information, and details thereof will be described later.

"Number of reading hints presented" represents the number of words displayed as hints in a reading test to be described later. For example, when this data column contains a numerical value (e.g., "1", "2", etc.), the hint information of the same number of words as the numerical value among hint target words is displayed. When the data column contains "all", the hint information of all the hint target words is displayed.

The content of "Number of listening hints presented" and the content of "Number of reading hints presented" are preset and registered in accordance with a setting operation of the user.

Note that the user management DB 134 may further include data columns related to user attributes (gender, age, etc.) and other basic information (log-in history, language proficiency level, etc.).

FIG. 6 is a diagram illustrating a content example of the learning history DB 135.

The learning history DB 135 stores data related to a learning history of each user in the learning support service. The learning history DB 135 has a data block generated for each user. One data row (record) in each data block corresponds to a word searched for by the user or a word displayed as a hint in a test taken by the user.

Each data block has data columns (columns) of "User ID", "Word", "Search date", "Hint display date", and "Audio play".

"User ID" is a code common to the user ID in the user management DB 134 in FIG. 5.

"Word" is a word (item) corresponding to the data row.

"Search date" is a date representing a time point at which the word in the data row was last searched for. Note that time information may be further registered in addition to the date.

"Hint display date" is a date representing a time point at which the word in the data row was displayed as a hint in a test taken by the user. Note that time information may be further registered in addition to the date.

"Audio play" indicates whether or not the audio data of the pronunciation of the word was played when the word was searched for. A word with its audio data having been played is set to "1", and a word with its audio data having not been played is set to "0".

For example, it is possible to specify, from the learning history DB 135 illustrated in FIG. 6, that a user with a user ID "U1234" searched for the word "software" on "Aug. 15, 2021" and has not played the audio data thereof, and that the word "software" was displayed as a hint in the test performed on "Sep. 1, 2021". Also, it is possible to specify that a user with a user ID "1235" in FIG. 6 has never searched for the word "software" and has never played the audio thereof, and that the word "software" was displayed as a hint in the test performed on "Jul. 15, 2021".

The operation part 14 illustrated in FIG. 2 includes a pointing device such as a mouse, a keyboard, and the like, receives a position input, a key input, and the like by the user, and outputs the operation information thereof to the CPU 11.

The display part 15 includes a display device, such as a liquid crystal display, and performs various displays on the display device in accordance with a display control signal from the CPU 11.

The communication part 16 includes a network card or the like and transmits and receives data to and from the terminal device 20 on the communication network N in accordance with a predetermined communication standard.

<Configuration of Terminal Device 20>

FIG. 7 is a block diagram illustrating the functional configuration of the terminal device 20.

The terminal device 20 includes a CPU 21 (question asking unit and hint information presentation unit), a RAM 22, a storage part 23, an operation part 24, a display part 25, an audio output part 26, a communication part 27, a bus 28, and the like. Each part of the terminal device 20 is connected through a bus 28.

The CPU 21 is a processor (processing part) that reads and executes a program such as the learning application 231 stored in the storage part 23 and performs various types of arithmetic processing to control the operation of the terminal device 20. Note that the terminal device 20 may include a plurality of processors (e.g., a plurality of CPUs), and the plurality of processors may execute a plurality of types of processing executed by the CPU 21 of the present embodiment. In this case, the plurality of processors form the processing part. In this case, the plurality of processors may be involved in common processing, or each of a plurality of processors may independently execute different processing in parallel.

The storage part 23 is a non-transitory recording medium readable by the CPU 21 serving as a computer and stores programs such as the learning application 231 and various data. The storage part 23 includes, for example, a nonvolatile memory such as flash memory. The program is stored in the storage part 23 in the form of a computer-readable program code.

The operation part 24 includes a touch panel, a physical button, and the like provided to be superimposed on the display screen of the display part 25, receives a touch operation on the touch panel by the user, a pressing operation on the physical button, and the like, and outputs the operation information thereof to the CPU 21.

The display part 25 includes a display device, such as a liquid crystal display, and performs various displays on the display device in accordance with a display control signal from the CPU 21.

The audio output part 26 includes a speaker and outputs audio such as generation of a word or a test question sentence in accordance with an audio output control signal from the CPU 21. Furthermore, the audio output part 26 outputs an audio signal to an external audio output device (e.g., earphones, headphones, etc.) connected in a wired or wireless manner, thereby outputting audio from the audio output device.

The communication part 27 includes a communication module including an antenna and the like and transmits and receives data to and from the server 10 on the communication network N in accordance with a predetermined communication standard.

<Operation of Learning Support System 1>

Next, an operation of the learning support system 1 will be described. The operation subjects in the following operation are the CPU 11 of the server 10 and the CPU 21 of the terminal device 20, but in the following description, the server 10 and the terminal device 20 may be described as the operation subjects for convenience.

The user who receives the learning support service by the learning support system 1 executes the learning application 231 in the terminal device 20 and logs in the learning support system 1. The login to the learning support system 1 is performed by, for example, authentication processing of collating a user ID and a password input by the user and transmitted from the terminal device 20 to the server 10 with a user ID and a password registered in the server 10 in advance. The user who has logged in to the learning support system 1 can execute various functions of the learning support service on the learning application 231.

(Word Search)

One of the basic functions of the learning support service by the learning support system 1 is a search for a word in the English-Japanese dictionary. By performing a predetermined operation on the learning application 231, the user can cause the display part 25 to display a dictionary screen 40 for performing a word search in the English-Japanese dictionary.

FIG. 8 is a view illustrating the dictionary screen 40.

The dictionary screen 40 displays a search box 41 for specifying a word to be searched for, an item information display area 42 in which item information of the searched word is displayed, an audio play button 43 for playing the audio of the word, a dictionary screen end button 44 for ending the word search, and the like. When the search is performed in a state where the spelling of the word to be searched for has been input in the search box 41, the terminal device 20 acquires the item information of the word from the server 10 and displays the acquired item information in the item information display area 42. Further, the server 10 registers the search date on which the search for the word was performed in the data block corresponding to the user who has performed the search in the learning history DB 135. As a result, the history of the search for the word by the user is recorded.

The user can play (output) the audio of the word displayed in the item information display area 42 by performing an operation of selecting the audio play button 43 on the dictionary screen 40. That is, when the audio play button 43 is selected, the terminal device 20 acquires the audio data of the word from the server 10 and causes the audio output part 26 to output the audio of the word by using the audio data. Further, the server 10 registers, in the data block corresponding to the user who has played the audio of the word in the learning history DB 135, that the audio play has been performed for the word. As a result, the history of the play of the audio of the word by the user is recorded.

As described above, the learning support system 1 can perform a search for a word included in data related to a book or a document, a search for a word included in data provided by a Web service, or the like, in addition to a search for a word in various dictionaries. Also, when these searches are performed, the search history of the word and the play history of the audio are recorded.

(Test)

The learning support service by the learning support system 1 can perform a test regarding a language. By taking this test, the user can receive the determination of the learning level and fix the learning content. In the present embodiment, a listening test and a reading test will be described as examples. In the listening test, for example, a question sentence is presented by audio from the audio output part 26, and an appropriate one of a plurality of options included in the question sentence is answered. In the reading test, for example, a question sentence is displayed on the display part 25 and presented, and an appropriate one of a plurality of options included in the question sentence is answered. However, the content of the test is not limited thereto.

The user can cause a test screen 50 for performing a test to be displayed on the display part 25 by performing a predetermined operation on the learning application 231.

FIG. 9 is a view illustrating the test screen 50 for performing a listening test.

The test screen 50 displays a question sentence play button 51 for playing the audio of the question sentence, an answer button 52 for answering the question, a hint request button 53 for requesting hint information, a hint display area 54 in which the hint information is displayed, a test end button 55 for ending the test, and the like. When the test screen 50 is displayed, and the listening test is started, the terminal device 20 receives question sentence data from the server 10. The question sentence data includes the audio data and correct answer data of the question sentence. When an image is included in the question, the question sentence data further includes the image data of the image, and the image is displayed on the test screen 50 after the acquisition of the question sentence data.

When the question sentence play button 51 is selected after the reception of the question sentence data is completed, the audio of the question sentence is played (output from the audio output part 26). In the example illustrated in FIG. 9, audios of four sentences corresponding to options A to D illustrated in the lower part of FIG. 9 are played as question sentences. The user can answer the question by selecting an answer button 52 of an option that seems to be correct (to match the content of the image) among the plurality of answer buttons 52 from the content of the question sentence. When any one of the answer buttons 52 is selected, the correct/incorrect determination result is displayed on the display part 25. Alternatively, after answers to a plurality of questions are completed, correct/incorrect determination results regarding the plurality of questions may be displayed collectively.

After the audio of the question sentence is played, the presentation of the hint information related to the question can be requested by selecting the hint request button 53 before selecting the answer button 52. When the hint request button 53 is selected, first, a hint spot selection screen 60 for selecting an option for displaying hint information (hereinafter also referred to as a "hint spot") is displayed.

FIG. 10 is a view illustrating the hint spot selection screen 60.

On the hint spot selection screen 60, a selection button 61 for specifying a hint spot, a hint display button 62 for displaying hint information, and the like are displayed. When an operation of selecting the hint display button 62 is performed in a state where one of the options A to D is specified by selecting one of the selection button 61, an option (hint spot) for presenting the hint information is determined, and a request for transmitting hint data including hint information H (which is first hint information H1 or second hint information H2 to be described later, and hereinafter, any one of the first hint information H1 and the second hint information H2 is referred to as "hint information H") related to the option is transmitted from the terminal device 20 to the server 10. Upon receiving the hint data from the server 10, the terminal device 20 displays (presents) the hint information H on the test screen 50 (hint information presentation processing).

FIGS. 11A and 11B are views illustrating the test screen 50 on which the hint information H is displayed.

Here, a case where the hint information H of the option B is requested and displayed will be described as an example. In each of the test screens 50 of FIGS. 11A and 11B, the hint information H related to the word "software", which is one of the plurality of words forming the question sentence of the option B, is displayed in the hint display area 54. The hint information H to be displayed is selected by the server 10 and transmitted to the terminal device 20. The hint information H is selected from the item information of the item "software" included in the dictionary DB 132. Further, the hint information H with different content is selected in accordance with the history of the search for the word "software" by the user. In the listening test of the present embodiment, there are a case where the first hint information H1 including only the notation (spelling) of the word is displayed as illustrated in FIG. 11A and a case where the second hint information H2 including the notation (spelling) and the translation of the word is displayed as illustrated in FIG. 11B in accordance with the word search history.

Hereinafter, an operation related to the selection of the hint information H by the server 10 will be described.

The server 10 executes hint information selection processing of selecting the hint information H to be presented to the user for each of the hint target words among the plurality of words forming the designated hint spot in the question sentence in response to the presentation request for the hint information. Here, the hint target word is a word obtained by excluding words not appropriate as words for presenting the hint information H from a plurality of words forming the hint spot. Specifically, words excluding words with low proficiency difficulty levels, such as those learned in lower grades like elementary school (in the present embodiment, words with "proficiency difficulty levels" in the dictionary DB 132 being less than "4"), numerals ("one", "two", etc.), pronouns ("you", "me", etc.), and proper nouns ("Mt. Fuji" etc.) are set as the hint target words.

Note that, instead of the word itself included in the question sentence, the hint target word may be a word related to the word, for example, a derivative word, or the like. For example, when the question sentence includes the word "inventor", the word "invention" that is a derivative of the word may be used as the hint target word. When the word included in the question sentence is a conjugation form of a certain word, the original form of the word may be used as the hint target word. When the word included in the question sentence is an original form of a certain word, a conjugation form of the word may be used as the hint target word. For example, when the question sentence includes a past form or a past fractional form of a verb, the original form of the word may be used as the hint target word. In addition, the hint target word is not limited thereto, and the hint target word may be any word that can be a hint for the user to answer the question. For example, the hint target word may be selected from words except for the word (including the derivative word and the conjugation form thereof) included in the question sentence.

In the hint information selection processing performed for each word that is the hint target word, the server 10 selects the hint information H to be presented to the user from the item information of the word in the dictionary DB 132. Specifically, a satisfaction status of each of a plurality of different search history conditions is discriminated based on the history of the search for the word by the user in the learning history DB 135, and the content of the hint information H to be selected for the word is made different in accordance with the discrimination result of the satisfaction status.

Specifically, the first search history condition of the plurality of search history conditions is an audio non-play condition that is satisfied when the learning history DB 135 includes a history of searching for the word and does not include a history of playing the audio of the word (corresponding to a "first status"). The satisfaction status of the non-search condition is discriminated based on the data columns of "Search date" and "Audio play" in the learning history DB 135. For example, in the case of the test taken by the user with the user ID "U1234" on Sep. 1, 2021, "Search date" is registered for the word "software", and "Audio play" is "0" (not played) in the data block with the user ID "U1234" in the learning history DB 135 illustrated in FIG. 6, so that it is determined that the audio non-play condition is satisfied.

In a case that it is determined that the audio non-play condition is satisfied, the user who is taking the test has already searched for the word, and it can thus be estimated that the user can grasp the meaning from the notation of the word. On the other hand, the user has not played the audio of the word, and it can thus be estimated that the user cannot hear the word from the audio of the question sentence. Therefore, in a case that it is determined that the audio non-play condition is satisfied, the server 10 selects the notation of the word as the hint information H (first hint information H1) of the word. In response to this, for example, in the above test being taken by the user ID "U1234", the notation of the word "software" is displayed as the first hint information H1 in the hint display area 54 as illustrated in FIG. 11A. When the notation of the word is presented as the first hint information H1, the user can specify the word that could not be heard and can associate the word with the meaning of the learned word.

The second search history condition of the plurality of search history conditions is a non-search condition that is satisfied when the history of searching for the word is not included in the learning history DB 135 (corresponding to a "second status"). The satisfaction status of the non-search condition is discriminated based on the data columns of "Search date" and "Audio play" in the learning history DB 135. For example, in the case of the test taken by the user with the user ID "U1235" on Jul. 15, 2021, "Search date" is not registered for the word "software", and "Audio play" is "0" (not played) in the data block with the user ID "U1235" in the learning history DB 135 illustrated in FIG. 6, so that it is determined that the non-search condition is satisfied.

In a case that it is determined that the non-search condition is satisfied, the user has not searched for the word, and it can thus be estimated that the user has not learned the meaning of the word. Further, the user has not played the audio of the word, either, and it can thus be estimated that the user cannot hear the word from the audio of the question sentence, either. Therefore, in a case that it is determined that the non-search condition is satisfied, the server 10 selects the notation and translation of the word as the hint information H (second hint information H2) of the word. In response to this, for example, in the above test being performed by the user ID "U1235", the notation and translation of the word "software" are displayed as the second hint information H2 in the hint display area 54 as illustrated in FIG. 11B. By the notation of the word being presented as the second hint information H2, the user can specify the word that could not be heard and can also grasp the meaning of the word from the translation of the hint information H.

In the listening test of the present embodiment, hint information is not displayed for a word, the search history of which is included in the learning history DB 135 and the audio play history of which is included in the learning history DB 135, assuming that the user's proficiency level of the word is high.

When performing the hint information selection processing for each word included in the hint spot (each hint target word) to select the hint information H, the server 10 selects a predetermined number of words, the hint information H of which is displayed on the test screen 50. The number of words to be selected here is determined in accordance with "Number of listening hints presented" in the user management DB 134. A method for selecting the word for displaying the hint information H is not particularly limited but may be, for example, a method for selecting the word in descending order of difficulty. That is, when "Number of listening hints presented" is "1", a word with the highest difficulty level is selected from among the plurality of hint target words included in the hint spot, and the hint information H of the word is transmitted to the terminal device 20 and displayed on the test screen 50. When "Number of listening hints presented" is equal to or larger than "2", the hint information H of the number of words selected in descending order of difficulty is transmitted to the terminal device 20 and displayed in a list or in order on the test screen 50. When "Number of listening hints presented" is "all", the hint information H of all the hint target words included in the hint spot is transmitted to the terminal device 20 and displayed in a list or in order on the test screen 50.

Next, an operation to present the hint information H in the reading test will be described.

FIG. 12A is a view illustrating a test screen 80 for performing the reading test.

The test screen 80 displays a question sentence display area 81 in which the question sentence is displayed, an answer button 82 for answering the question, a hint request button 83 for requesting the hint information H, a hint display area 84 in which the hint information H is displayed, a test end button 85 for ending the test, and the like. The functions of the answer button 82, the hint request button 83, the hint display area 84, and the test end button 85 are similar to those of the answer button 52, the hint request button 53, the hint display area 54, and the test end button 55 described above.

When the test screen 80 is displayed, and the reading test is started, the terminal device 20 receives the question sentence data from the server 10. The question sentence data includes the text data and correct answer data of the question sentence. When an image is included in the question, the question sentence data further includes the image data of the image, and the image is displayed on the test screen 80 after the acquisition of the question sentence data.

When the reception of the question sentence data is completed, the text of the question sentence is displayed in the question sentence display area 81 of the test screen 80. Here, a question is displayed in which an appropriate word is to be selected from options A to D as a word to fill a blank in the question sentence. The user can answer the question by selecting an answer button 82 of an option considered to be correct among the plurality of answer buttons 82 from the content of the question sentence. When any one of the answer buttons 82 is selected, the correct/incorrect determination result is displayed on the display part 25. Alternatively, after answers to a plurality of questions are completed, correct/incorrect determination results regarding the plurality of questions may be displayed collectively.

After the question sentence is displayed, the presentation of the hint information related to the question can be requested by selecting the hint request button 83 before selecting the answer button 82. When the hint request button 83 is selected, a transmission request for hint data including the hint information H is transmitted from the terminal device 20 to the server 10. When receiving the hint data from the server 10, the terminal device 20 displays (presents) the hint information H in the hint display area 84 of the test screen 80. In FIG. 12A, "unnecessarily" has been selected as a target word for presenting the hint information H from the plurality of words forming the question sentence excluding the options A to D, and the second hint information H2 of the word is displayed.

In the reading test as well, the hint information H with different content is selected in accordance with the search history of the word ("unnecessarily") as the presentation target of the hint information H by the user. In the reading test of the present embodiment, depending on the search history, there are a case where the second hint information H2 including the notation of the word "unnecessarily" and the item information (here, the translation) in the English-Japanese dictionary is displayed as illustrated in FIG. 12A, and a case where the first hint information H1 including the notation of the word "unnecessarily" and the item information in the English-English dictionary is displayed as illustrated in FIG. 12B. Hereinafter, an operation related to the selection of the hint information H by the server 10 will be described.

In the reading test, the first search history condition of the plurality of search history conditions described above is a first search time condition that is determined to be satisfied in a case that the time point at which the word as the display target of the hint information H was last searched for a reference time point or later (corresponding to a "first status"). The second search history condition of the plurality of search history conditions is a second search time condition that is determined to be satisfied in a case that the time point at which the word as the display target of the hint information H was last searched for is before the reference time point (corresponding to "second status") and when there is no search history of the word (corresponding to a "second status"). The reference time point can be determined such that the length of the period from the reference time point to the current time point falls within the range of the length of the period during which the memory of the learning content of the searched word is normally maintained, and the length of the period may be, for example, about one month. The satisfaction statuses of the first search time condition and the second search time condition are discriminated based on the data column of "Search date" in the learning history DB 135.

In a case that it is determined that the first search time condition of these conditions is satisfied, the user is considered to have memorized the meaning of the word learned by searching for the word at the reference time point or later and to have a certain proficiency level with the word. Therefore, in a case that it is determined that the first search time condition is satisfied, the server 10 selects the item information in the English-English dictionary with a high reading difficulty level (low readability) as the hint information H (first hint information H1), as illustrated in FIG. 12B.

On the other hand, in a case that it is determined that the second search time condition is satisfied, the user is considered to have possibly forgotten the meaning of the word learned by searching for the word before the reference time point or to have not searched for the word and not learned the meaning of the word. Therefore, in a case that it is determined that the second search time condition is satisfied, the server 10 selects the item information of the English-Japanese dictionary having a low reading difficulty level (high readability) as the hint information H (second hint information H2), as illustrated in FIG. 12A.

The English-Japanese dictionary and the English-English dictionary described above are examples of a case where the native language of the user taking the test is Japanese. When the native language of the user is another language than Japanese, a dictionary in which the item information is described in the native language of the user may be used instead of the English-Japanese dictionary, and a dictionary in which the item information is described in another language than the native language of the user may be used instead of the English-English dictionary.

Further, in the reading test, similarly to the listening test described above, the user may be allowed to specify the hint spot. For example, as illustrated in FIG. 13, in the case of a question in which an appropriate answer to the question "What is the software?" is selected from the options A to D, when the hint request button 83 is selected, an option of a target for presenting the hint information H may be specifiable as a hint spot. FIG. 13 illustrates a case where the user selects the option B by a tap operation or the like. By selecting a hint display button 86 in this state, a target word for displaying the hint information H is selected from a plurality of words forming the text of the option B, and the hint information H related to the word is displayed by the above method.

Note that the first search history condition and the second search history condition are not limited to the above. When the first search history condition is satisfied in a case that the state of the search history of the word as the display target of the hint information H is the first status, the second search history condition can be an arbitrary condition that is determined to be satisfied in a case that the state of the search history of the word is the second status indicating that the proficiency level of the item is lower than that in the first status. In addition, the second hint information H2 selected In a case that it is determined that the second search history condition is satisfied can be arbitrarily selected from the item information of the word so as to have a larger amount of information or to have higher readability than the first hint information H1 selected In a case that it is determined that the first search history condition is satisfied.

(Display of Hint History)

In the learning support service by the learning support system 1, the user can cause a list of words corresponding to the hint information H, presented in the past to the user, to be displayed on a hint history screen 70 by performing a predetermined operation on the learning application 231.

FIG. 14 is a view illustrating the hint history screen 70. On the hint history screen 70, a list of hint history words 71, which are words corresponding to the hint information H presented in the past, a hint history screen end button 72 for closing the hint history screen 70, and the like are displayed. In each hint history word 71, the date on which the hint information H related to the hint history word 71 was displayed is displayed. The hint history word 71 and the date displayed on the hint history screen 70 are specified based on "Hint display date" in the learning history DB 135. By performing an operation of selecting the hint history word 71, a transition can be made to the dictionary screen 40 (FIG. 8) including the item information of the word.

(Control Procedure for Word Search Processing)

Next, a control procedure for word search processing for displaying the dictionary screen 40 of FIG. 8 will be described.

FIG. 15 is a flowchart illustrating a control procedure for word search processing.

In FIG. 15, word search processing executed by the CPU 21 of the terminal device 20 and word search processing executed by the CPU 11 of the server 10 are illustrated side by side.

When the word search processing is started, the CPU 21 of the terminal device 20 causes the display part 25 to display the dictionary screen 40 (step S101). At this stage, the item information display area 42 may be in a blank state.

The CPU 21 discriminates whether or not a word search operation has been performed by the user, that is, whether or not the spelling of the word has been input to the search box 41 and a search execution instruction has been received (step S102). When determining that the word search operation has been performed ("YES" in step S102), the CPU 21 requests the server 10 for the word data of the specified word (data including item information of the word) (step S103). Here, the CPU 21 transmits a request signal for the word data to the server 10.

When receiving the request signal for the word data, the CPU 11 of the server 10 refers to the dictionary DB 132 and transmits the word data including the item information of the specified word to the terminal device 20 (step S201). In addition, the CPU 11 updates the search history of the word in the learning history DB 135 (step S202). Here, the CPU 11 registers the search date of the word to be searched for in the data block corresponding to the logged-in user in the learning history DB 135.

When receiving the word data, the CPU 21 of the terminal device 20 causes the item information of the word to be displayed in the item information display area 42 of the dictionary screen 40 (step S104).

The CPU 21 discriminates whether or not an operation of selecting the audio play button 43 has been performed (step S105), and when determining that the operation has been performed ("YES" in step S105), the CPU 21 requests the server 10 for the audio data of the word (step S106). Here, the CPU 21 transmits a request signal for the audio data to the server 10.

When receiving the request signal for the audio data, the CPU 11 of the server 10 refers to "Audio file path" in the dictionary DB 132, acquires the audio data of the specified word, and transmits the audio data to the terminal device 20 (step S203). In addition, the CPU 11 updates the play history of the audio of the word in the learning history DB 135 (step S204). Here, the CPU 11 changes the item of "Audio play" of the word to be searched for to "1" in the data block corresponding to the logged-in user in the learning history DB 135.

When receiving the audio data of the word, the CPU 21 of the terminal device 20 causes the audio of the word to be played (step S107). Here, the CPU 11 supplies the audio data to the audio output part 26 and causes the audio output part 26 to output the audio of the word.

When step S107 ends, and when it is determined in step S102 that the word search operation has not been performed ("NO" in step S102), or when it is determined in step S105 that the operation of selecting the audio play button 43 has not been performed ("NO" in step S105), the CPU 21 discriminates whether or not an operation of selecting the dictionary screen end button 44 has been performed (step S108). When determining the operation of selecting the dictionary screen end button 44 has not been performed ("NO" in step S108), the CPU 21 returns the processing to step S102. When determining that the operation of selecting the dictionary screen end button 44 has been performed ("YES" in step S108), the CPU 21 closes the dictionary screen 40 (step S109) and ends the word search processing.

In addition, when the processing of step S204 ends, the CPU 11 of the server 10 ends the word search processing.
(Control Procedure for Test Processing)

Next, a control procedure for test processing for performing the test operation described above will be described. Here, test processing in a case that a listening test is performed will be described as an example.

FIG. 16 is a flowchart illustrating a control procedure for test processing executed by the CPU 21 of the terminal device 20.

When the test processing is started, the CPU 21 of the terminal device 20 causes the display part 25 to display the test screen 50 (step S301). The CPU 21 requests the server 10 for the question sentence data and receives the question sentence data (step S302).

The CPU 21 discriminates whether or not an operation of selecting the question sentence play button 51 has been performed (step S303). When determining that the operation has been performed ("YES" in step S303), the CPU 21 (question asking unit) plays the audio data of the question sentence and makes the question be asked (step S304). Here, the CPU 21 supplies the audio data to the audio output part 26 and causes the audio output part 26 to output the audio of the question sentence.

The CPU 21 discriminates whether or not an operation of selecting the hint request button 53 has been performed (step S305), and when determining that the operation has been performed ("YES" in step S305), the CPU 21 causes the hint spot selection screen 60 to be displayed (step S306). The CPU 21 discriminates whether or not an operation of selecting a hint spot has been performed using the selection button 61 and the hint display button 62 (step S307), and when determining that the operation has not been performed ("NO" in step S307), the CPU 21 executes step S307 again.

When determining that the operation of selecting the hint spot has been performed ("YES" in step S307), the CPU 21 requests the server 10 for hint data including the hint information H for the selected hint spot and receives the hint data (step S308). When receiving the hint data, the CPU 21 (hint information presentation unit) causes the hint information H to be displayed in the hint display area 54 of the test screen 50 (step S309). Further, the CPU 21 requests the server 10 to register the hint display history of the word, the hint information H of which has been displayed (step S310).

When the processing of step S310 ends, or when it is determined in step S305 that the operation of selecting the hint request button has not been performed ("NO" in step S305), the CPU 21 discriminates whether or not an operation of selecting the answer button 52 has been performed (step S311). When determining that the operation of selecting the answer button 52 has not been performed ("NO" in step S311), the CPU 21 returns the processing to step S305. When determining that the operation of selecting the answer button 52 has been performed ("YES" in step S311), the CPU 21 determines whether an answer is correct or incorrect by referring to correct answer data included in the question sentence data and causes a correct/incorrect determination result to be displayed (step S312).

When the processing in step S312 ends, or when it is determined in step S303 that the operation of selecting the question sentence play button 51 has not been performed ("NO" in step S303), the CPU 21 discriminates whether or not an operation of selecting the test end button 55 has been performed (step S313). When determining that the operation of selecting the test end button 55 has not been performed ("NO" in step S313), the CPU 21 returns the processing to step S303, and when determining that the operation has been performed ("YES" in step S313), the CPU 21 closes the test screen 50 (step S314) and ends the test processing.

Steps S308 and S309 in the test processing of FIG. 16 correspond to the "hint information presentation processing".

FIG. 17 is a flowchart illustrating a control procedure for test processing executed by the CPU 11 of the server 10.

The test processing on the server 10 side in FIG. 17 is executed in parallel with the test processing on the terminal device 20 side in FIG. 16.

When the test processing is started, the CPU 11 of the server 10 discriminates whether or not a transmission request for the question sentence data has been received from the terminal device 20 (step S401). When determining that the transmission request for the question sentence data has not been received ("NO" in step S401), the CPU 11 executes step S401 again. When determining that the transmission request for the question sentence data has been received ("YES" in step S401), the CPU 11 refers to the data columns of "Audio file path", "Image file path", and "Correct answer" in the test DB 133 and transmits the question sentence data including the audio data, the image data, and the correct answer data of the question sentence to the terminal device 20 (step S402).

The CPU 11 (reception unit) discriminates whether or not a transmission request for hint data has been received from the terminal device 20, that is, whether or not a presentation request for hint information related to the question asked to the user has been received (step S403). When determining that the transmission request for the hint data has not been received ("NO" in step S403), the CPU 11 executes step S403 again, and when determining that the transmission request for the hint data has been received ("YES" in step S403), the CPU 11 executes the hint data generation processing (step S404).

FIG. 18 is a flowchart illustrating a control procedure for the hint data generation processing.

When the hint data generation processing is called, the CPU 11 refers to the data column of "Text" in the test DB 133 and generates a list of a plurality of words forming the hint spot from the text list of the question sentence (step S501).

The CPU 11 substitutes "0" to a variable N (step S502) and discriminates whether or not the value of the variable N is less than the number of words in the word list generated in step S501 (step S503). When determining that the value of the variable N is less than the number of words in the word list ("YES" in step S503), the CPU 11 discriminates whether or not the Nth word in the word list corresponds to the hint target word described above (step S504). Here, the CPU 11 refers to the data columns of "Part of speech" and "Proficiency difficulty level" in the dictionary DB 132 and determines that the word does not correspond to the hint target word when the word corresponds to the word to be excluded described above, such as a numeral, a pronoun, and a word with a proficiency difficulty level less than a threshold.

When determining that the Nth word corresponds to the hint target word ("YES" in step S504), the CPU 11 discriminates whether or not the Nth word is a searched word (step S505). Here, the CPU 11 refers to the data block corresponding to the user who is taking the test in the learning history DB 135 and determines the word as a searched word when the search date is registered for the word.

When determining that the Nth word is not a searched word ("NO" in step S505), the CPU 11 determines that the non-search condition (second search history condition) is satisfied, and selects the notation and translation of the Nth word as the hint information H (second hint information H2) (step S506). Here, the CPU 11 refers to the item information of the Nth word in the dictionary DB 132 and acquires the data of the notation and translation of the word from the item information.

The CPU 11 discriminates whether or not the Nth word is a word having a plurality of meanings (step S509). For example, the word "bear" has two meanings of "bear (animal)" and "endure". Such a word is registered in the dictionary DB 132 in two divided items, and thus, when the word is registered in the dictionary DB 132 in two or more divided items, the CPU 11 determines that the word has a plurality of meanings. When the word has a plurality of meanings ("YES" in step S509), the CPU 11 selects an appropriate translation of the word in accordance with the translation of the question sentence based on the translation of the question sentence registered in the data column "Translation" in the test DB 133 (step S510).

When step S510 ends, or when it is determined in step S509 that the word is not a word having a plurality of meanings ("NO" in step S509), the CPU 11 adds the selected hint information H to the hint data (step S511).

On the other hand, when determining in step S505 that the Nth word is a searched word ("YES" in step S505), the CPU 11 discriminates whether or not the Nth word is a word with its audio having been played (step S507). Here, the CPU 11 refers to the data block corresponding to the user who is taking the test in the learning history DB 135, and when the data column of "Audio play" is "1" for the word, the CPU 11 determines the word as a word with its audio having been played.

When determining that the Nth word is not a word with its audio having been played ("NO" in step S507), the CPU 11 determines that the audio non-play condition (first search history condition) is satisfied, and selects only the notation of the Nth word as the hint information H (first hint information H1) (step S508). Here, the CPU 11 refers to the item information of the Nth word in the dictionary DB 132 and acquires the data of the notation of the word from the item information. Thereafter, the CPU 11 shifts the processing to step S511 and adds the selected hint information H to the hint data.

When determining that the Nth word is a word with its audio having been played ("YES" in step S507), the CPU 11 considers that the proficiency level of the word is high, and shifts the processing to step S512 without selecting the hint information H for the word. Also, when step S511 ends, or when it is determined in step S504 that the Nth word does not correspond to the hint target word ("NO" in step S504), step S512 is performed. In step S512, the CPU 11 substitutes "N+1" for the variable N and shifts the processing to step S503.

In step S503, when determining that the value of the variable N is equal to or larger than the number of words in the word list ("NO" in step S503), the CPU 11 selects the number of words corresponding to "Number of listening hints presented" in the user management DB 134, and generates the hint data including the hint information H of the word (step S513). In other words, the CPU 11 adjusts the number of words included in the hint data (the number of pieces of hint information H) in accordance with "Number of listening hints presented" in the user management DB 134.

When step S513 ends, the CPU 11 ends the hint data generation processing and returns the processing to the test processing.

In the hint data generation processing of FIG. 18, steps S504, S505, and S507 are executed by the CPU 11 serving as the acquisition unit and the discrimination unit. Further, steps S506 and S508 to S511 are executed by the CPU 11 serving as the determination unit.

When the hint data generation processing (step S404) ends in FIG. 17, the CPU 11 transmits the generated hint data to the terminal device 20 (step S405).

In response to the registration request for the hint display history (step S310 in FIG. 16) from the terminal device 20, the CPU 11 registers the word, the hint information H of which has been displayed, in the learning history DB 135 (step S406). Here, the CPU 11 registers the date on which the hint was displayed in "Hint display date" in the learning history DB 135.

When step S406 ends, the CPU 11 ends the test processing.

FIG. 19 is a flowchart illustrating a control procedure for the hint data generation processing in the reading test.

When the reading test is being performed, the hint data generation processing of FIG. 19 is executed instead of the hint data generation processing of FIG. 18. Steps S601 to S605 and S609 to S613 in the hint data generation processing of FIG. 19 are the same as steps S501 to S505 and S509 to S513 in the hint data generation processing of FIG. 18, respectively, and hence the description thereof is omitted.

In the hint data generation processing of FIG. 19, when the Nth word is determined to be a searched word in step S605 ("YES" in step S605), the CPU 11 discriminates whether or not the date and time when the word was last searched for is the reference time point or later (step S606). When determining that the search date and time is the reference time point or later ("YES" in step S606), the CPU 11 determines that the first search time condition (first search history condition) is satisfied, and selects the notation and item information of the Nth word in the English-English dictionary as the hint information H (first hint information H1) (step S607). Here, the CPU 11 refers to the item information of the Nth word in the English-English dictionary in the dictionary DB 132 and acquires the data of the notation and the item information of the word.

On the other hand, when determining in step S605 that the Nth word has not been searched ("NO" in step S605), or when determining in step S606 that the date and time at which the word was last searched for is earlier than the reference time point ("NO" in step S606), the CPU 11 determines that the second search time condition (second search history condition) is satisfied, and selects the notation and translation of the Nth word in the English-Japanese dictionary as the hint information H (second hint information H2) (step S608). Here, the CPU 11 refers to the item information of the Nth word in the English-Japanese dictionary in the dictionary DB 132 and acquires the notation and translation data of the word from the item information.

The subsequent processing is similar to the hint data generation processing in FIG. 18.

In the hint data generation processing of FIG. 19, steps S604 to S606 are executed by the CPU 11 serving as the acquisition unit and the discrimination unit. Further, S507 to S611 are executed by the CPU 11 serving as the determination unit.

(Control Procedure for Hint History Display Processing)

Next, a description will be given of a control procedure for the hint history display processing for performing the hint history display operation using the hint history screen 70 of FIG. 14.

FIG. 20 is a flowchart illustrating a control procedure for the hint history display processing.

The hint history display processing is executed by the CPU 11 serving as the hint history presentation unit. When the hint history display processing is started, the CPU 21 of the terminal device 20 causes the display part 25 to display the hint history screen 70 (step S701).

The CPU 21 acquires the hint history data related to the hint information H displayed in the past from the server 10 (step S702). Here, the server 10 transmits the hint history data including the data of the word, "Hint display date" of which is registered in the learning history DB 135, to the terminal device 20. When receiving the hint history data, the CPU 21 causes the hint history word 71 to be displayed on the hint history screen 70 (step S703).

The CPU 21 discriminates whether or not an operation of selecting the hint history word 71 has been performed (step S704). When determining that the operation has been performed ("YES" in step S704), the CPU 21 causes the display on the display part 25 to transition to the dictionary screen 40 (step S705), acquires the item information of the word selected in the dictionary DB 132 from the server 10 (step S706), and causes the item information of the selected word to be displayed on the dictionary screen 40 (step S707).

The CPU 21 discriminates whether or not the operation of selecting the dictionary screen end button 44 has been performed (step S708), and when determining that the operation has not been performed ("NO" in step S708), the CPU 21 executes step S708 again. When determining that the operation has been performed ("YES" in step S708), the CPU 21 closes the dictionary screen 40 (step S709) and ends the hint history display processing.

On the other hand, when determining in step S704 that the operation of selecting the hint history word 71 has not been performed ("NO" in step S704), the CPU 21 discriminates whether or not an operation of selecting the hint history screen end button 72 has been performed (step S710). When determining that the operation has not been performed ("NO" in step S710), the CPU 21 returns the processing to step S704, and when determining that the operation has been performed ("YES" in step S710), the CPU 21 closes the hint history screen 70 (step S711) and ends the hint history display processing.

Effects

As described above, the server 10 serving as the information processing device according to the present embodiment includes the CPU 11, and the CPU 11 acquires the search history information from the learning history DB 135 for the word related to the question asked to the user (acquisition unit), discriminates the satisfaction status of the search history condition for the search history information (discrimination unit), and determines the hint information H related to the question to be presented to the user based on the discrimination result of the satisfaction status (determination unit). It is thereby possible to select and determine the hint information H having appropriate content in accordance with the state of the history of the search for the word by the user. Therefore, it is possible to present to the user the appropriate hint information H in accordance with the user's proficiency level of the word. In addition, the user can confirm necessary information (the notation or translation of the word) in a timely manner and can thus perform learning efficiently.

Further, the CPU 11 discriminates satisfaction statuses of a plurality of different search history conditions for the search history information (discrimination unit), and one of the plurality of search history conditions is a first search history condition that is determined to be satisfied in a case that a state of a search history of the word is a first status. Another one of the plurality of search history conditions is a second search history condition that is determined to be satisfied in a case that the state of the search history of the word is a second status indicating that the proficiency level of the word is lower than that in the first status. In a case that it is determined that the first search history condition is satisfied, the CPU 11 serving as the determination unit selects the first hint information H1 from the item information related to the word as the hint information H to be presented to the user. On the other hand, In a case that it is determined that the second search history condition is satisfied, the second hint information H2 having a larger amount of information or having higher readability than the first hint information H1 is selected from the item information related to the word as the hint information H to be presented to the user. As a result, the hint information H of an appropriate amount of information in accordance with the user's proficiency level of the word or the hint information H having appropriate readability can be presented to the user.

The word as the display target of the hint information H is any of a plurality of words forming the question sentence of the question. The question is given by the audio of the question sentence. The first search history condition is an audio non-play condition that is satisfied when the learning history DB 135 includes a history of searching for the word and does not include a history of playing the audio of the word. The second search history condition is a non-search condition that is satisfied when the history of searching for the word is not included in the learning history DB 135. In a case that it is determined that the audio non-play condition is satisfied, the CPU 11 serving as the determination unit selects the notation of the word as the first hint information H1. On the other hand, In a case that it is determined that the non-search condition is satisfied, the CPU 11 selects the notation and translation of the word as the second hint information H2.

In a case that it is determined that the audio non-play condition is satisfied, the user who is taking the test has already searched for the word, and it can thus be estimated that the user can grasp the meaning from the notation of the word. On the other hand, the user has not played the audio of the word, and it can thus be estimated that the user cannot hear the word from the audio of the question sentence. Therefore, In a case that it is determined that the audio non-play condition is satisfied in the listening test, by selecting the notation of the word as the hint information H, the user can specify the word that could not be heard and can associate the word with the meaning of the learned word. It is thus possible to present the appropriate hint information H in accordance with the user's proficiency level of the word.

On the other hand, when the non-search condition is satisfied, it can be estimated that the user has not learned the meaning of the word. Further, the user has not played the audio of the word, either, and it can thus be estimated that the user cannot hear the word from the audio of the question sentence, either. Therefore, In a case that it is determined that the non-search condition is satisfied in the listening test, by selecting the notation and translation of the word as the hint information H, the user can specify the word that has not been heard from the notation of the word in the hint information H and can also grasp the meaning of the word from the translation of the word in the hint information H. It is thus possible to present the appropriate hint information H in accordance with the user's proficiency level of the word.

In addition, by presenting the notation of the word as the hint information H, even in a case that the user does not remember the word itself of the question sentence in the listening test and cannot specify the spelling for searching for the dictionary, it is possible to provide the user with information (spelling) necessary for proceeding with learning, so that it is possible to improve the learning efficiency of the user.

The word as the display target of the hint information H is any of a plurality of words forming the question sentence of the question. The question is given by displaying the question sentence. The first search history condition includes a first search time condition that is determined to be satisfied in a case that the time point at which the word was last searched for is a reference time point or later. The second search history condition includes a second search time condition that is determined to be satisfied in a case that the time point at which the word was last searched for is before the reference time point and when the history of searching for the word is not included in the search history information. Therefore, the CPU 11 can present the user with the hint information H of an appropriate amount of information in accordance with the length of the elapsed period from the time point at which the word was last searched for (learned) (and the presence or absence of the search history), or the hint information H having appropriate readability. That is, when the time point at which the word was last searched for is before the reference time point (or when there is no search history), it is estimated that there is a possibility that the user has forgotten (or has not learned) the learning content of the word, and the CPU 11 can present the hint information H having a large amount of information or the hint information H having high readability.

In a case that it is determined that the first search time condition is satisfied in the reading test, the CPU 11 serving as the determination unit selects the first hint information H1 from the item information of the English-English dictionary (item information described in another language than the native language of the user) in the dictionary DB 132. In a case that it is determined that the second search time condition is satisfied, the CPU 11 selects the second hint information H2 from the item information of the English-Japanese dictionary (item information described in the native language of the user) in the dictionary DB 132. As described above, when the elapsed period from the time point at which the word was last searched for (learned) is short, the CPU 11 presents the item information of the English-English dictionary having low readability as the hint information H, so that it is possible to present the first hint information H1 at a level suitable for the user having a high proficiency level and to encourage the user to learn additional English related to the content of the English-English dictionary. When the elapsed period from the time point at which the word was last searched for (learned) was last searched for (learned) is long, and when the word has not been searched for, the CPU 11 presents the item information of the English-Japanese dictionary having high readability as the hint information H, thereby presenting the second hint information H2 at a level suitable for the user having a low proficiency level.

The CPU 11 serving as the determination unit selects the word as the display target of the hint information H from words having proficiency difficulty levels equal to or higher than a predetermined lower limit difficulty level (in the above embodiment, words having proficiency difficulty levels equal to or more than a threshold), among the plurality of words. It is thereby possible to prevent the hint information H at a level unnecessary for many users from being displayed.

The CPU 11 serving as a hint history presentation unit presents the word corresponding to the hint information H presented to the user in the past to the user based on the learning history DB 135 including the hint history information related to the presentation history of the hint information H to the user. Hence the user can effectively review the word.

The CPU 11 serving as the determination unit may select a plurality of pieces of hint information H corresponding to a plurality of words related to the question. It is thereby possible to provide an appropriate amount of the hint information H to the user.

Further, the terminal device 20 according to the present embodiment includes the CPU 21, and the CPU 21 asks a question to the user (question asking unit) and presents the hint information H to the user in response to a presentation request for the hint information H related to the question asked to the user (hint information presentation unit). The hint information H presented by the CPU 21 serving as the hint information presentation unit is determined based on the discrimination result obtained by determining whether or not the search history information of the word related to the question satisfies the search history condition. As a result, it is possible to present the appropriate hint information H in accordance with the user's proficiency level of the word to the user. In addition, the user can confirm necessary information (the notation or translation of the word) in a timely manner and can thus perform learning efficiently.

Further, the learning support system 1 serving as the information processing system according to the present embodiment includes the server 10 and the terminal device 20 serving as the information processing device, in which the CPU 21 of the terminal device 20 asks a question to the user (question asking unit), the CPU 11 of the server 10 acquires search history information from the learning history DB 135 for a word related to the question asked to the user (acquisition unit), discriminates a satisfaction status of a search history condition for the search history information (discrimination unit), and determines the hint information H related to the question to be presented to the user based on a discrimination result of the satisfaction status (determination unit), and the CPU 21 of the terminal device 20 presents the hint information H, determined by the CPU 11 serving as the determination unit of the server 10, to the user (hint information presentation unit). As a result, it is possible to present the appropriate hint information H in accordance with the user's proficiency level of the word to the user. In addition, the user can confirm necessary information (the notation or translation of the word) in a timely manner and can thus perform learning efficiently.

Further, an information processing method according to the present embodiment is an information processing method performed by a computer (the CPU 11 and the CPU 21) of the learning support system 1 serving as an information processing system, the method including: presenting a question to a user; acquiring search history information from the learning history DB 135 for a word related to the question presented to the user; discriminating a satisfaction status of a search history condition for the search history information; determining hint information H related to the question to be presented to the user based on a discrimination result of the satisfaction status; and presenting the determined hint information H to the user. As a result, it is possible to present the appropriate hint information H in accordance with the user's proficiency level of the word to the user. In addition, the user can confirm necessary information (the notation or translation of the word) in a timely manner and can thus perform learning efficiently.

Further, the server control program 131 according to the present embodiment causes the CPU 11 serving as a computer provided in the server 10 serving as an information processing device to function as: an acquisition unit that acquires search history information from the learning history DB 135 for a word related to a question asked to the user; a discrimination unit that discriminates a satisfaction status of a search history condition for the search history information; and a determination unit that determines the hint information H related to the question to be presented to the user based on the discrimination result of the satisfaction status. As a result, it is possible to present the appropriate hint information H in accordance with the user's proficiency level of the word to the user.

<Others>

Note that the descriptions in the above embodiment are examples of the information processing device, the terminal device, the information processing system, the information processing method, and the program according to the present disclosure, and are not limited thereto.

For example, a part or all of the processing executed by the server 10 in the above embodiment may be executed by the terminal device 20. When the CPU 21 of the terminal device 20 executes the hint information selection processing, the terminal device 20 corresponds to the "information processing device".

The aspect in which the hint information is displayed on the test screen 50 has been shown as an example, but the present invention is not limited thereto, and the hint information may be presented by audio output instead of or in addition to display. For example, on the test screen 50 in FIG. 11A, in addition to the notation of the word "software", the audio of the word may be output from the audio output part 26.

In the listening test, the hint information H may be made different based on the satisfaction statuses of the first search time condition and the second search time condition. For example, when the time point at which the word was last searched for is the reference time point or later (when the first search time condition is satisfied), only the notation of the word is selected as the hint information H, and when the time point at which the word was last searched for is before the reference time point and when there is no search history of the word (when the second search time condition is satisfied), the notation and translation of the word may be selected as the hint information H.

The first hint information H1 and the second hint information H2 are not limited to those shown as examples in the above embodiment. The first hint information H1 and the second hint information H2 may be any information selected such that the second hint information H2 has a larger amount of information or has higher readability than the first hint information H1.

The plurality of search history conditions may include three or more search history conditions. For example, the number of searches for the word or the time when the word was last searched for may be divided into three or more categories, and the content of the hint information may be made different by using the discrimination results of three or more search history conditions that are satisfied in the case of corresponding to each category.

When the plurality of search history conditions to be discriminated includes three or more search history conditions, the hint information H may be determined in accordance with the number of satisfied search history conditions.

The search history condition is not limited to the one shown as an example in the above embodiment but can be a condition in which the satisfaction status is discriminated based on an arbitrary parameter related to the search, such as the presence or absence of the search, the number of searches, the frequency of the search (the interval of the search), and the time of the search.

In the above embodiment, the satisfaction statuses of the plurality of different search history conditions have been discriminated, and the hint information to be presented has been determined based on the discrimination result. However, the hint information to be presented may be alternatively determined based on the discrimination result of the satisfaction status of one search history condition. For example, it may be discriminated only whether or not the "non-search condition" is satisfied for the hint target word, and when it is determined that the "non-search condition" is satisfied, the notation and translation of the word may be displayed as the hint information, and when it is determined that the "non-search condition" is not satisfied, the hint information may not be displayed.

In the above description, an example in which the HDD and the SSD of the storage part 13 are used as the computer-readable medium of the program according to the present disclosure has been disclosed, but the present disclosure is not limited to this example. As another computer-readable medium, an information recording medium such as flash memory or a compact disc read-only memory (CD-ROM) can be applied. In addition, a carrier wave is also applied as a medium for providing data of a program according to the present disclosure through a communication line.

In addition, it is a matter of course that the detailed configuration and the detailed operation of each component of the learning support system 1, the server 10, and the terminal device 20 in the embodiment described above can be appropriately changed without departing from the gist of the present disclosure.

Although the embodiment of the present disclosure has been described, the scope of the present disclosure is not limited to the embodiment described above but includes the scope of the invention described in the claims and the equivalent scope thereof.

What is claimed is:

1. An information processing device comprising at least one processor, wherein the processor is configured to execute processes comprising:
   acquiring search history information on a word related to a question asked to a user, the word being one of a plurality of words forming a question sentence of the question, and the question being asked by playing audio of the question sentence;
   in response to receiving a request for audio data of the word, transmitting the audio data to an external device, and recording a history of playing the audio data of the word in the search history information; and
   determining hint information to be presented to the user, the hint information being related to the question and being determined based on a discrimination result obtained by determining whether or not the acquired search history information satisfies a predetermined search history condition,
   wherein:
   the determining includes determining that a first search history condition included in the search history condition is satisfied in a case that the search history information includes a history of searching for the word and does not include a history of playing the audio data of the word,
   the search history condition includes the first search history condition and a second search history condition,
   the first history condition is a condition that is determined to be satisfied in a case that a status of the search history on the word is a first status,
   the second search history condition is a condition that is determined to be satisfied in a case that the status of the search history on the word is a second status indicating that a proficiency level of the word is lower than a proficiency level of the word in the first status,
   the first search history condition is an audio non-play condition that is determined to be satisfied in the case that the search history information includes the history of searching for the word and does not include the history of playing the audio data of the word,
   the second search history condition is a non-search condition that is determined to be satisfied in a case that the history of searching for the word is not included in the search history information, and
   the processes further comprise:
   determining whether or not the acquired search history information satisfies one of the first search history condition and the second search history condition;
   selecting, as the hint information to be presented to the user, first hint information from item information related to the word in a case that it is determined that the acquired search history information satisfies the first search history condition;
   selecting, as the hint information to be presented to the user, second hint information having a larger amount of information or a higher readability than the first hint information from the item information related to the word in a case that it is determined that the acquired search history information satisfies the second search history condition;
   selecting a notation of the word as the first hint information in a case that it is determined that the acquired search history information satisfies the audio non-play condition; and
   selecting the notation and a translation of the word as the second hint information in a case that it is determined that the acquired search history information satisfies the non-search condition.

2. The information processing device according to claim 1, wherein:
   the first search history condition is a first search time condition that is determined to be satisfied in a case that a time point at which the word was last searched for is a reference time point or later, and
   the second search history condition is a second search time condition that is determined to be satisfied in a case that the time point at which the word was last searched for is before the reference time point and the history of searching for the word is not included in the search history information.

3. The information processing device according to claim 2, wherein the processes further comprise:
   selecting the first hint information from the item information described in another language than a native language of the user in a case that it is determined that the acquired search history information satisfies the first search time condition, and
   selecting the second hint information from the item information described in the native language of the user in a case that it is determined that the acquired search history information satisfies the second search time condition.

4. The information processing device according to claim 1, wherein the processor selects the word from among plural words which are included in the plurality of words and which each have a proficiency difficulty level equal to or higher than a predetermined lower limit difficulty level.

5. The information processing device according to claim 1, wherein the processes further comprise:
   acquiring hint history information that is a presentation history of the hint information to the user; and
   presenting the word corresponding to the hint information to the user, after already having presented the hint information to the user, based on the acquired hint history information.

6. The information processing device according to claim 1, wherein the processes further comprise determining a plurality of pieces of the hint information, each of the plurality of the pieces of the hint information corresponding to a respective one of a plurality of the words related to the question.

7. A terminal device comprising at least one processor, wherein the processor is configured to execute processes comprising:
asking a question to a user, the question being asked by playing audio of a question sentence of the question;
acquiring search history information on a word related to the question asked to the user, the word being one of a plurality of words forming the question sentence of the question;
in response to receiving a request for audio data of the word, receiving the audio data transmitted from an external device, and recording a history of playing the audio data of the word in the search history information;
determining hint information to be presented to the user, the hint information being related to the question asked to the user and being determined based on a discrimination result obtained by determining whether or not the acquired search history information satisfies a predetermined search history condition, and the determining including determining that a first search history condition included in the search history condition is satisfied in a case that the search history information includes a history of searching for the word and does not include a history of playing the audio data of the word; and
presenting the hint information to the user in response to a presentation request made by the user to present the hint information,
wherein:
the search history condition includes the first search history condition and a second search history condition,
the first history condition is a condition that is determined to be satisfied in a case that a status of the search history on the word is a first status,
the second search history condition is a condition that is determined to be satisfied in a case that the status of the search history on the word is a second status indicating that a proficiency level of the word is lower than a proficiency level of the word in the first status,
the first search history condition is an audio non-play condition that is determined to be satisfied in the case that the search history information includes the history of searching for the word and does not include the history of playing the audio data of the word,
the second search history condition is a non-search condition that is determined to be satisfied in a case that the history of searching for the word is not included in the search history information, and
the processes further comprise:
determining whether or not the acquired search history information satisfies one of the first search history condition and the second search history condition;
selecting, as the hint information to be presented to the user, first hint information from item information related to the word in a case that it is determined that the acquired search history information satisfies the first search history condition;
selecting, as the hint information to be presented to the user, second hint information having a larger amount of information or a higher readability than the first hint information from the item information related to the word in a case that it is determined that the acquired search history information satisfies the second search history condition;
selecting a notation of the word as the first hint information in a case that it is determined that the acquired search history information satisfies the audio non-play condition; and
selecting the notation and a translation of the word as the second hint information in a case that it is determined that the acquired search history information satisfies the non-search condition.

8. An information processing system comprising:
an information processing device; and
a terminal device,
wherein:
the information processing device and the terminal device are communicably connected to each other,
each of the information processing device and the terminal device includes at least one processor,
the processor of the information processing device is configured to execute processes comprising:
acquiring, from the terminal device, search history information on a word related to a question transmitted to the terminal device and asked to a user of the terminal device, the word being one of a plurality of words forming a question sentence of the question, and the question being asked by playing audio of the question sentence;
in response to receiving a request for audio data of the word, transmitting the audio data to the terminal device, and recording a history of playing the audio data of the word in the search history information; and
determining hint information to be presented to the user, the hint information being related to the question and being determined based on a discrimination result obtained by determining whether or not the acquired search history information satisfies a predetermined search history condition, and the determining including determining that a first search history condition included in the search history condition is satisfied in a case that the search history information includes a history of searching for the word and does not include a history of playing the audio data of the word,
the processor of the terminal device is configured to receive the hint information from the processor of the information processing device, and to present the hint information to the user,
the search history condition includes the first search history condition and a second search history condition,
the first history condition is a condition that is determined to be satisfied in a case that a status of the search history on the word is a first status,
the second search history condition is a condition that is determined to be satisfied in a case that the status of the search history on the word is a second status indicating that a proficiency level of the word is lower than a proficiency level of the word in the first status,
the first search history condition is an audio non-play condition that is determined to be satisfied in the case that the search history information includes the history of searching for the word and does not include the history of playing the audio data of the word,
the second search history condition is a non-search condition that is determined to be satisfied in a case that the history of searching for the word is not included in the search history information, and the processor of the information processing device is configured to execute further processes comprising:
  determining whether or not the acquired search history information satisfies one of the first search history condition and the second search history condition;
  selecting, as the hint information to be presented to the user, first hint information from item information related to the word in a case that it is determined that the acquired search history information satisfies the first search history condition;
  selecting, as the hint information to be presented to the user, second hint information having a larger amount of information or a higher readability than the first hint information from the item information related to the word in a case that it is determined that the acquired search history information satisfies the second search history condition;
  selecting a notation of the word as the first hint information in a case that it is determined that the acquired search history information satisfies the audio non-play condition; and
  selecting the notation and a translation of the word as the second hint information in a case that it is determined that the acquired search history information satisfies the non-search condition.

9. An information processing method performed by a computer of an information processing system, the information processing method comprising:
  acquiring, from a terminal device with which the computer is communicably connected, search history information on a word related to a question asked to a user of the terminal device, the word being one of a plurality of words forming a question sentence of the question, and the question being asked by playing audio of the question sentence;
  in response to receiving a request for audio data of the word, transmitting the audio data to the terminal device, and recording a history of playing the audio data of the word in the search history information;
  determining hint information to be presented to the user, the hint information being related to the question and being determined based on a discrimination result obtained by determining whether or not the acquired search history information satisfies a predetermined search history condition, and the determining including determining that a first search history condition included in the search history condition is satisfied in a case that the search history information includes a history of searching for the word and does not include a history of playing the audio data of the word; and
  transmitting the hint information to the terminal device as the hint information to be presented to the user,
  wherein:
  the search history condition includes the first search history condition and a second search history condition,
  the first history condition is a condition that is determined to be satisfied in a case that a status of the search history on the word is a first status,
  the second search history condition is a condition that is determined to be satisfied in a case that the status of the search history on the word is a second status indicating that a proficiency level of the word is lower than a proficiency level of the word in the first status,
  the first search history condition is an audio non-play condition that is determined to be satisfied in the case that the search history information includes the history of searching for the word and does not include the history of playing the audio data of the word,
  the second search history condition is a non-search condition that is determined to be satisfied in a case that the history of searching for the word is not included in the search history information, and
  the method further comprises:
    determining whether or not the acquired search history information satisfies one of the first search history condition and the second search history condition;
    selecting, as the hint information to be presented to the user, first hint information from item information related to the word in a case that it is determined that the acquired search history information satisfies the first search history condition;
    selecting, as the hint information to be presented to the user, second hint information having a larger amount of information or a higher readability than the first hint information from the item information related to the word in a case that it is determined that the acquired search history information satisfies the second search history condition;
    selecting a notation of the word as the first hint information in a case that it is determined that the acquired search history information satisfies the audio non-play condition; and
    selecting the notation and a translation of the word as the second hint information in a case that it is determined that the acquired search history information satisfies the non-search condition.

10. A non-transitory computer-readable recording medium recording a program thereon, the program being executable by a computer provided in an information processing device to control the computer to execute processes comprising:
  acquiring search history information on a word related to a question asked to a user, the word being one of a plurality of words forming a question sentence of the question, and the question being asked by playing audio of the question sentence;
  in response to receiving a request for audio data of the word, transmitting the audio data to an external device, and recording a history of playing the audio data of the word in the search history information; and
  determining hint information to be presented to the user, the hint information being related to the question and being determined based on a discrimination result obtained by determining whether or not the acquired search history information satisfies a predetermined search history condition,
  wherein:
  the determining includes determining that a first search history condition included in the search history condition is satisfied in a case that the search history information includes a history of searching for the word and does not include a history of playing the audio data of the word,
  the search history condition includes the first search history condition and a second search history condition,
  the first history condition is a condition that is determined to be satisfied in a case that a status of the search history on the word is a first status,
  the second search history condition is a condition that is determined to be satisfied in a case that the status of the search history on the word is a second status indicating that a proficiency level of the word is lower than a proficiency level of the word in the first status, the first search history condition is an audio non-play condition that is determined to be satisfied in the case that the search history information includes the history of searching for the word and does not include the history of playing the audio data of the word, the second search history condition is a non-search condition that is determined to be satisfied in a case that the history of searching for the word is not included in the search history information, and the processes further comprise:

determining whether or not the acquired search history information satisfies one of the first search history condition and the second search history condition;

selecting, as the hint information to be presented to the user, first hint information from item information related to the word in a case that it is determined that the acquired search history information satisfies the first search history condition;

selecting, as the hint information to be presented to the user, second hint information having a larger amount of information or a higher readability than the first hint information from the item information related to the word in a case that it is determined that the acquired search history information satisfies the second search history condition;

selecting a notation of the word as the first hint information in a case that it is determined that the acquired search history information satisfies the audio non-play condition, and selecting the notation and a translation of the word as the second hint information in a case that it is determined that the acquired search history information satisfies the non-search condition.

* * * * *